(12) United States Patent
Newton et al.

(10) Patent No.: US 7,452,113 B2
(45) Date of Patent: Nov. 18, 2008

(54) OPTICS FOR CONTROLLING THE DIRECTION OF LIGHT RAYS AND ASSEMBLIES INCORPORATING THE OPTICS

(75) Inventors: Mark W. Newton, Fairview, TX (US); John K. Roberts, East Grand Rapids, MI (US); Timothy A. Bonardi, Buchanan, MI (US); Jeremy A. Fogg, Holland, MI (US); Timothy J. Thomas, Zeeland, MI (US); Darin D. Tuttle, Byron Center, MI (US); Jeremy A. Walser, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 52 days.

(21) Appl. No.: 11/128,478

(22) Filed: May 13, 2005

(65) Prior Publication Data
US 2005/0265037 A1    Dec. 1, 2005

Related U.S. Application Data

(63) Continuation-in-part of application No. 10/796,649, filed on Mar. 9, 2004.

(51) Int. Cl.
*B60Q 1/26* (2006.01)
(52) U.S. Cl. .................. 362/494; 362/300; 362/327; 362/343; 362/498; 362/540
(58) Field of Classification Search .............. 362/494, 362/498, 540–545, 300, 301, 327, 343, 499; 359/841, 843, 290–295
See application file for complete search history.

(56) References Cited

U.S. PATENT DOCUMENTS

| | | | |
|---|---|---|---|
| 1,518,787 A | 12/1924 | Hall | |
| 5,005,009 A | 4/1991 | Roberts | |
| 5,014,167 A | 5/1991 | Roberts | |
| 5,128,659 A | 7/1992 | Roberts et al. | |
| 5,207,492 A | 5/1993 | Roberts | |
| 5,371,659 A | 12/1994 | Pastrick et al. | |
| 5,788,357 A | 8/1998 | Muth et al. | |
| 5,803,579 A | 9/1998 | Turnbull et al. | |
| 5,949,331 A | 9/1999 | Schofield et al. | |
| 6,000,823 A | 12/1999 | Desmond et al. | |
| 6,087,953 A | 7/2000 | DeLine et al. | |
| 6,124,886 A | 9/2000 | DeLine et al. | |
| 6,139,172 A | 10/2000 | Bos et al. | |
| 6,172,613 B1 | 1/2001 | DeLine et al. | |
| 6,176,602 B1 | 1/2001 | Pastrick et al. | |
| 6,183,119 B1 | 2/2001 | Desmond et al. | |
| 6,222,447 B1 | 4/2001 | Schofield et al. | |
| 6,222,460 B1 | 4/2001 | DeLine et al. | |
| 6,257,746 B1 | 7/2001 | Todd et al. | |
| 6,264,353 B1 | 7/2001 | Caraher et al. | |
| 6,276,821 B1 * | 8/2001 | Pastrick et al. .............. 362/494 |

(Continued)

FOREIGN PATENT DOCUMENTS

JP        60043878    *    3/1985       .................. 257/98

*Primary Examiner*—Sandra O'Shea
*Assistant Examiner*—Mark Tsidulko
(74) *Attorney, Agent, or Firm*—James E. Shultz, Jr.

(57) ABSTRACT

The present invention relates to improvements in controlling the direction of light rays and apparatus incorporating the improvements.

34 Claims, 38 Drawing Sheets

U.S. PATENT DOCUMENTS

| | | |
|---|---|---|
| 6,294,989 B1 | 9/2001 | Schofield et al. |
| 6,326,900 B2 | 12/2001 | DeLine et al. |
| 6,329,925 B1 | 12/2001 | Skiver et al. |
| 6,331,066 B1 | 12/2001 | Desmond et al. |
| 6,335,548 B1 | 1/2002 | Roberts et al. |
| 6,366,213 B2 | 4/2002 | DeLine |
| 6,386,742 B1 | 5/2002 | DeLine |
| 6,412,973 B1 | 7/2002 | Bos et al. |
| 6,416,208 B2 | 7/2002 | Pastrick et al. |
| 6,428,172 B1 | 8/2002 | Hutzel et al. |
| 6,441,943 B1 | 8/2002 | Roberts et al. |
| 6,445,287 B1 | 9/2002 | Schofield et al. |
| 6,483,438 B2 | 11/2002 | DeLine et al. |
| 6,498,620 B2 | 12/2002 | Schofield et al. |
| 6,501,387 B2 | 12/2002 | Skiver et al. |
| 6,521,916 B2 | 2/2003 | Roberts et al. |
| 6,550,949 B1 | 4/2003 | Bauer et al. |
| 6,568,839 B1 | 5/2003 | Pastrick et al. |
| 6,611,202 B2 | 8/2003 | Schofield et al. |
| 6,642,851 B2 | 11/2003 | DeLine et al. |
| 6,648,477 B2 | 11/2003 | Hutzel et al. |
| 6,670,207 B1 | 12/2003 | Roberts |
| 6,672,744 B2 | 1/2004 | DeLine et al. |
| 6,685,348 B2 | 2/2004 | Pastrick et al. |
| 6,690,268 B2 | 2/2004 | Schofield et al. |
| 6,756,912 B2 | 6/2004 | Skiver et al. |
| 6,870,656 B2 * | 3/2005 | Tonar et al. ............... 359/265 |
| 2004/0114384 A1 | 6/2004 | Carter et al. |

* cited by examiner

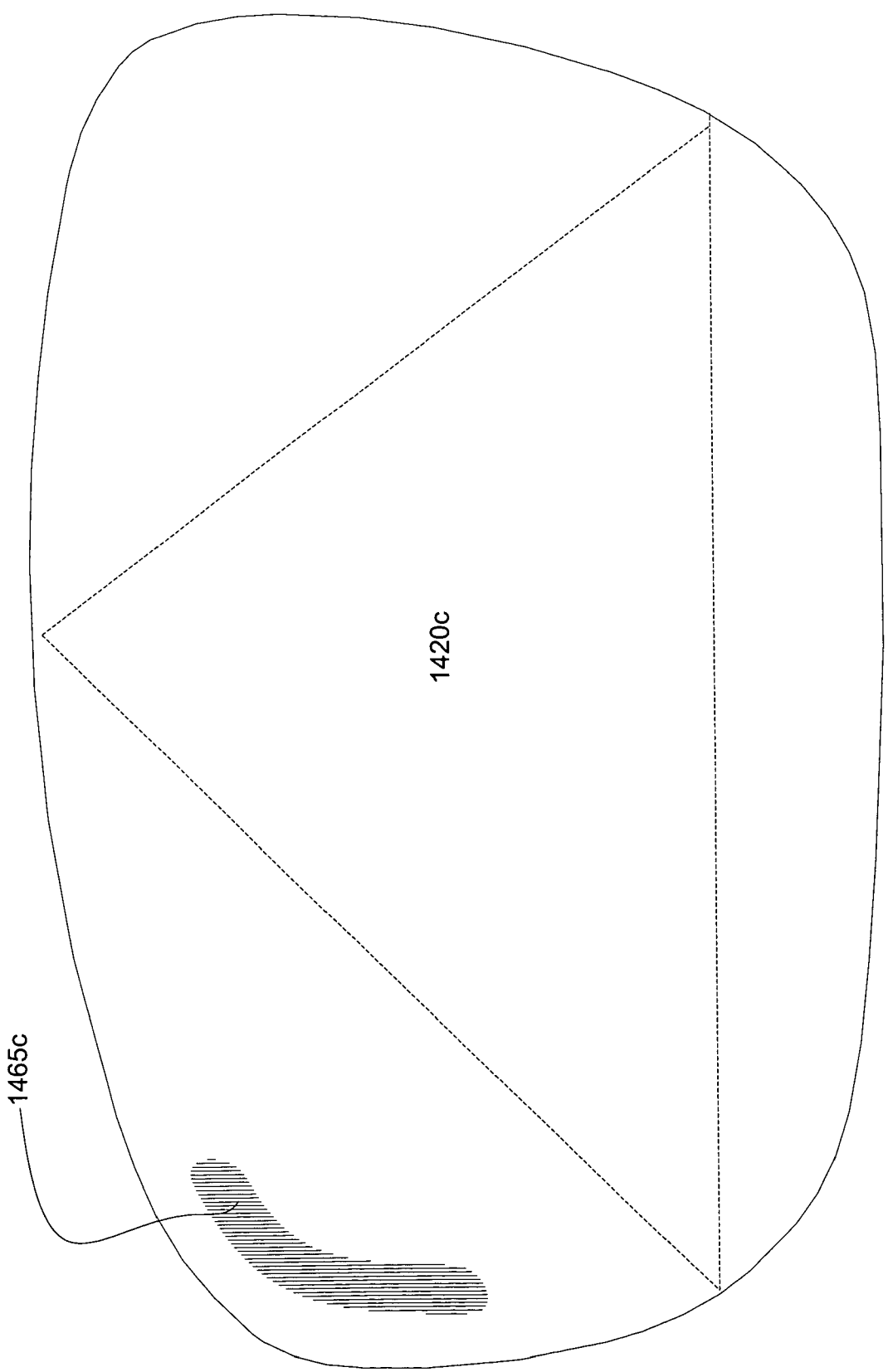

OPTICS FOR CONTROLLING THE DIRECTION OF LIGHT RAYS AND ASSEMBLIES INCORPORATING THE OPTICS

BACKGROUND

It has become desirable to provide a host of indicators, illuminators and information displays within various vehicle systems. More recently these devices have incorporated light emitting diodes as the light source that produces light rays. The term "light rays" as used herein should be understood in the context of an abstraction used in modeling optical systems.

What are needed are assemblies that emit light rays predominantly in a desired direction. Vehicle systems incorporating these assemblies are also needed.

SUMMARY

What are provided are improved assemblies for controlling the direction of light rays. Vehicle systems incorporating these assemblies are also provided.

BRIEF DESCRIPTION OF THE FIGURES

FIG. 2b depicts an exploded, perspective, view of the assembly of FIG. 2a;

FIG. 3b depicts a second perspective view of the assembly of FIG. 3a;

FIGS. 14a-k depict various embodiments of a rearview mirror comprising a composite light source having both illuminators and indicators.

DETAIL DESCRIPTION

Vehicles commonly incorporate various indicators, illuminators and displays. As the use of these devices multiplies, it becomes more desirable to selectively direct associated light rays such that a majority of the light rays emitted by any given light source are substantially visible when viewed from primarily a desired viewing perspective.

In at least one embodiment of the present invention a light source is positioned such that associated light rays pass through at least one substrate of a rearview mirror element. In related embodiments, at least one indicator, illuminator or information display is configured to be substantially covert when not activated. In a preferred embodiment, substantially all of the light rays emitted from at least one light source are redirected to be visible from the perspective of a driver of a vehicle traveling in the "blind spot" associated with a driver of a controlled vehicle. Yet, the associated light rays are substantially not visible from the perspective of the driver of the controlled vehicle. A related assembly is described in detail herein to be incorporated in an exterior rearview mirror assembly of a controlled vehicle as a blind spot viewable, supplemental turning indicator assembly; it is preferable that the driver of the controlled vehicle not be overly distracted by the associated light rays. In at least one embodiment, a central axis of the associated light rays emitted by a light source is directed approximately 32° (approximately 15°/−10°) outboard, away, from the controlled vehicle, rendering the light rays substantially invisible with regard to a driver of the controlled vehicle. In related embodiments, the central optical axis of the associated light rays forms between approximately 25° and approximately 40° (+ approximately 10° to approximately 20°/−approximately 5° to approximately 25°) outboard, away, from the controlled vehicle. The given angle may be a function of an expected mirror element angle with respect to the controlled vehicle and, or, a driver thereof. It should be understood that the angle formed between the controlled vehicle and the mirror element is user selectable. In at least one embodiment, a surface mount light emitting diode is used with a corresponding circuit board placement within 1 mm, horizontally and vertically, of a desired center placement point. Preferably, the supplemental turning indicator assembly is designed to allow for 1 mm maximum variance in component placement at the time of assembly.

Figure 1:
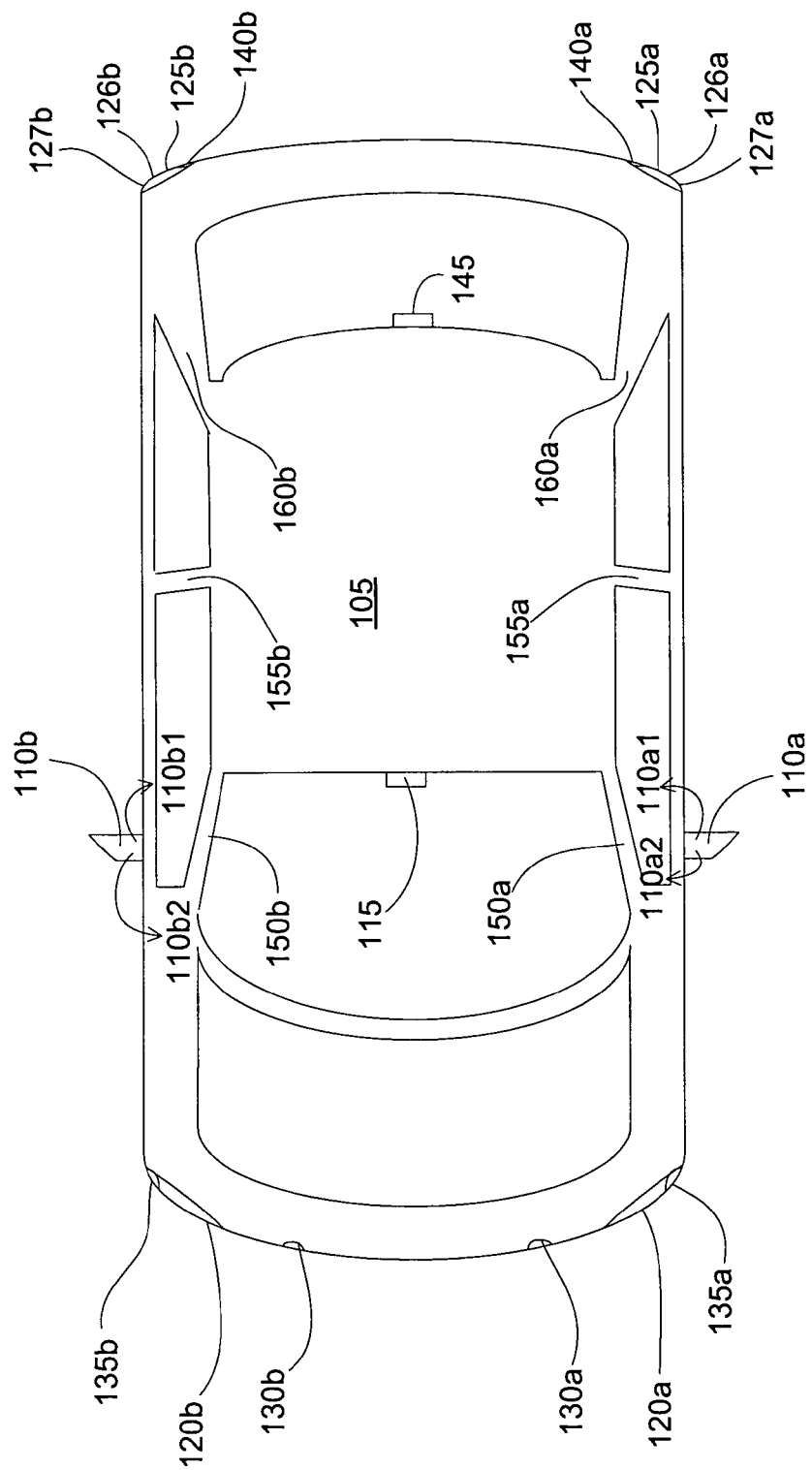
FIG. 1 depicts a controlled vehicle.

Turning now to FIG. 1 there is shown a controlled vehicle 105 comprising a driver's side rearview mirror 110a, a passenger's side rearview mirror 110b and rearview mirror 115. In a preferred embodiment, these rearview mirrors are configured to provide a driver of a controlled vehicle a view of substantially all of a scene generally rearward looking direction. As depicted, preferably the rearview mirrors 110a, 110b are configured to swivel rearwardly 110a1, 110b1 and forwardly 110a2, 110b2 relative to a controlled vehicle. Details of various embodiments of the present invention are described herein in conjunction with further description of various vehicle systems.

With additional reference to FIG. 1, the controlled vehicle is depicted to comprise taillight assemblies 125a, 125b; break lights 126a, 126b; rear turn signals 127a, 127b; backup lights 140a, 140b; headlight assemblies 120a, 120b; foul weather lights 130a, 130b; front turn signals 135a, 135b and a center high mounted stop light (CHMSL) 145. It should be understood that the controlled vehicle may comprise various combinations of the exterior lights described with respect to FIG. 1. It should also be understood that the controlled vehicle may comprise additional exterior lights or may even comprise individual assemblies that provide combined functionality.

Such as a headlight assembly that functions as a daytime running light, a low beam headlight, a high beam headlight, any one thereof, a subcombination thereof or a combination thereof. Continuously variable, bi-xenon, headlights are a specific example.

As additionally shown in FIG. 1, the controlled vehicle may comprise A-pillars 150a, 150b; B-pillars 155a, 155b and C-pillars 160a, 160b. Any of these locations, along with the rearview mirrors and exterior light assemblies, provide suitable locations for at least one imager, at least one indicator, at least one illuminator, at least one information display, any one thereof, a subcombination thereof or a combination thereof.

Figure 2A:
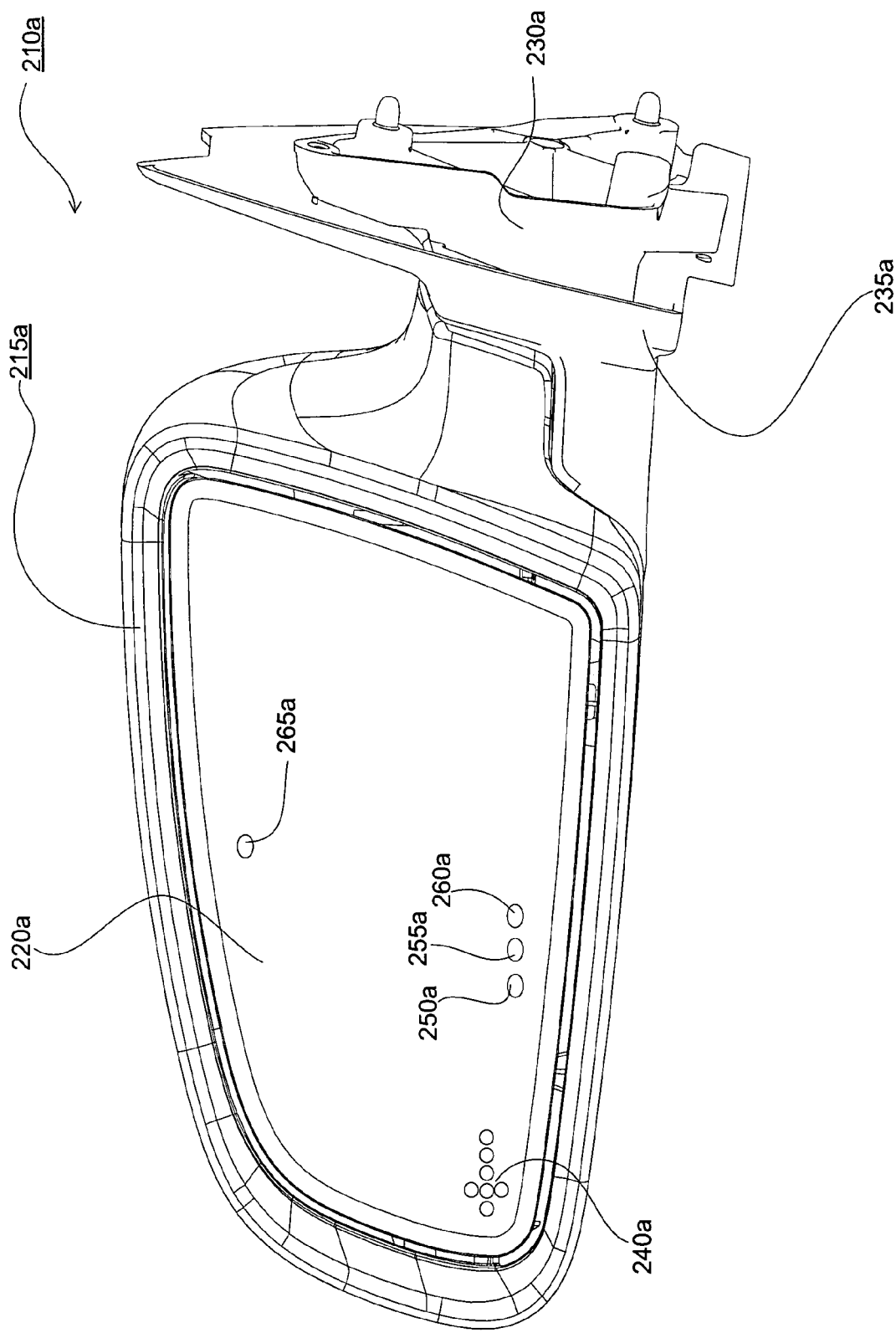
FIG. 2a depicts an exterior rearview mirror assembly.
Figure 2B:
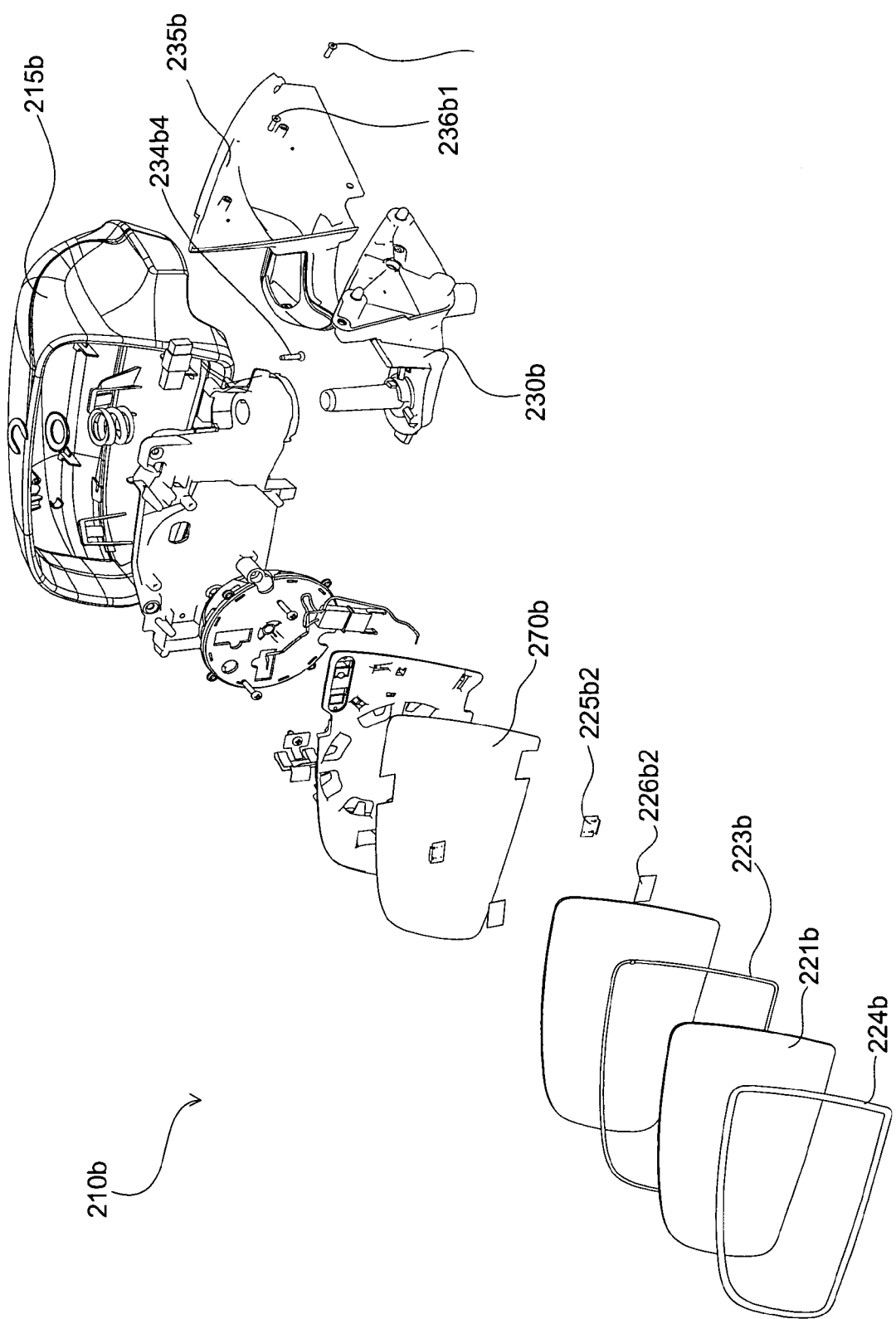

Turning to FIGS. 2a and 2b, there is shown a rearview mirror assembly 210a, 210b. Preferably, the mirror assembly comprises a mirror housing 215a, 215b comprising a mirror element 220a, 220b. Preferably, the mirror housing is configured to be pivotally mounted to a vehicle swivel structure 230a, 230b via a mirror swivel structure 232b. In at least one embodiment, the mirror assembly comprises a powered swivel means for swiveling the mirror swivel structure female portion 233b about the vehicle swivel structure male portion 231b. In at least one embodiment, the powered swivel means is configured to automatically swivel the mirror housing to a desired position in response to a corresponding button on a "keyfob." For example, a remote keyless entry system may be configured to swivel at least one mirror housing in a rearward direction in addition to unlocking a corresponding door. This functionality allows multiple use of a single illuminator, for example, a security light 255a may also serve as a keyhole/door illuminator 260a. In at least one embodiment, at least one light source of a supplemental turning indicator assembly is configured to provide a keyhole/door illuminator. The light source may be configured to emit a different spectral band of light rays as a function of the swivel position of an associated rearview mirror. For example, the light rays may be predominantly amber as a supplemental turning indicator assembly and predominantly white as a keyhole/door illuminator. It should be understood that the "unlock" button on a keyfob may be used or a devoted additional button may be added. Optionally, a given keyfob button may be configured such that a predetermined sequence of activations induces a predetermine swivel position. Additionally, the rearview mirror housing may be configured to swivel in a forwardly direction when subject to a "break away" force; preferably, the mirror housing would swivel and not break away. It should be understood that the keyfob button functionality may be configured to be user selectable or programmable. In at least one embodiment, a rearview mirror is configured such that it reverts to a predetermined swivel position upon opening of a door, closing a door, initiation of an ignition function, a second keyfob button, a keyfob sequence of button activation, any one thereof, a subcombination thereof or combination thereof. It should be understood that a rearview mirror assembly may be configured with vertical swivel functionality in addition to, or in lieu of, the horizontal functionality described herein.

With further reference to FIGS. 2a and 2b, the rearview mirror assembly comprises a supplemental turning indicator assembly 240a; a blind spot indicator 250a; a security light 255a; a keyhole/door illuminator 260a and a generally rearward facing photo sensor 265a. Preferably, these devices are positioned behind the mirror element with respect to a viewer such that they are at least partially covert. The mirror element 220a, 220b comprises a first substrate 221b and a second substrate 222b secured in a spaced apart relationship with one another via a primary seal 223b to form a chamber there between. Preferably, the chamber comprises an electro-optic medium such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. The mirror element further comprises electrical clips 225b1, 225b2, preferably, secured to the second substrate via adhesive 226b1, 226b2. The mirror element is then attached to a carrier 275b, preferably, via adhesive 270b. The carrier is attached to the mirror swivel structure 232b via a positioner 280b. The mirror swivel structure is secured to the vehicle swivel structure via spring 234b1, washer 234b2, lock ring 234b3 and fastener 234b4. The vehicle swivel structure is secured to the vehicle shroud 235a, 235b via fasteners 236b1, 136b2.

Figure 2C:
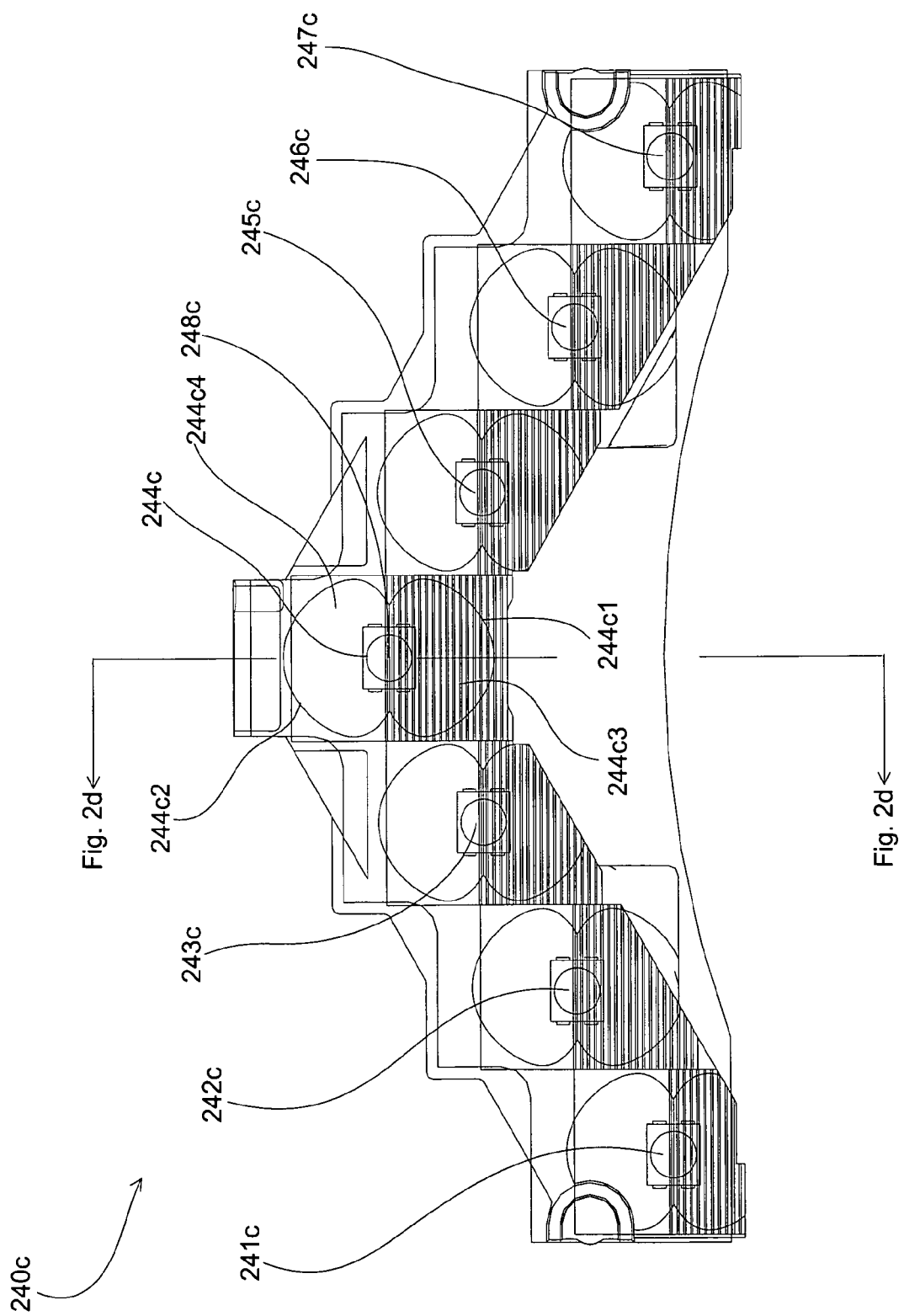
FIG. 2c depicts a plan view of a turn signal indicator.
Figure 2D:
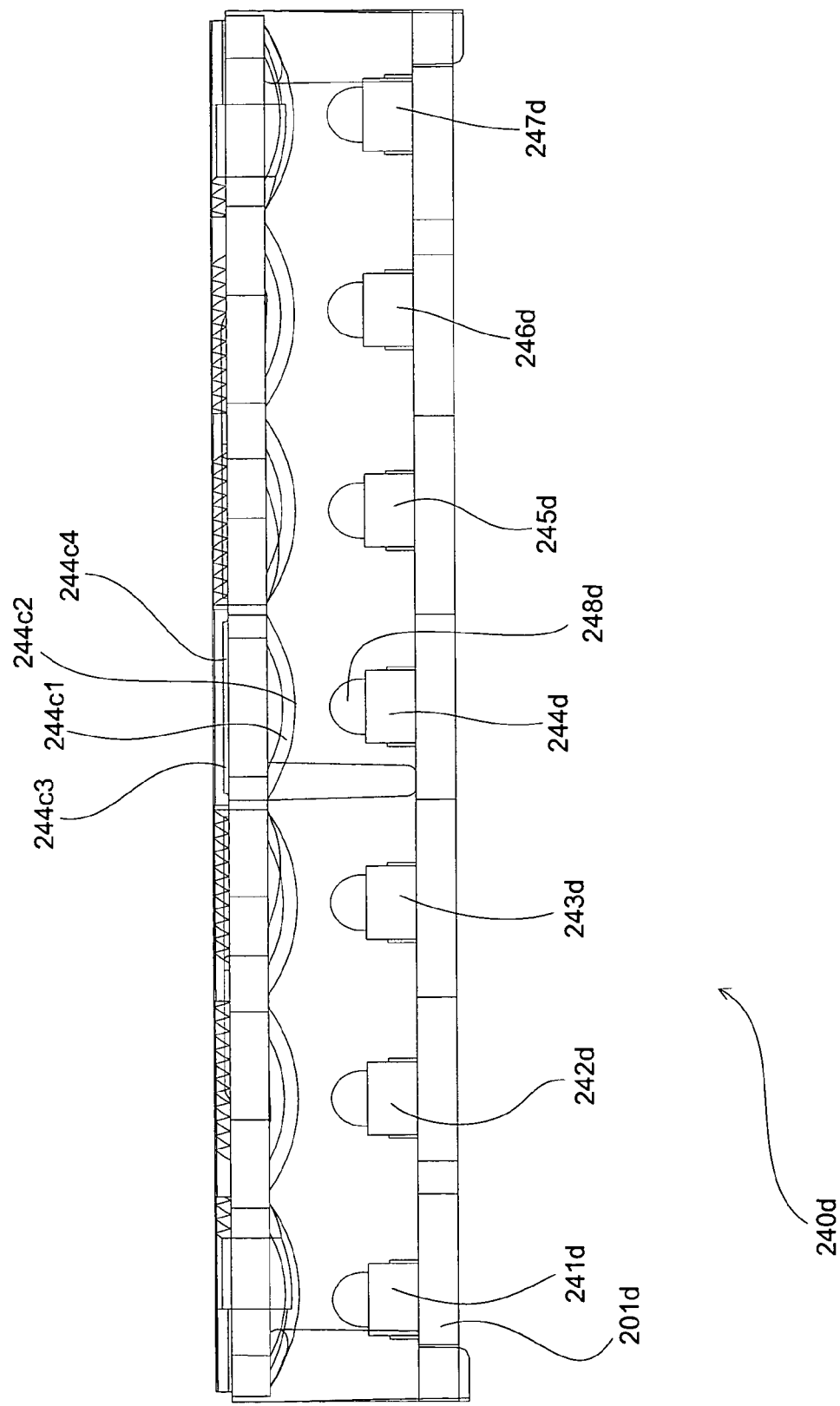
FIG. 2d depicts a profile view of the turn signal indicator of FIG. 2c.

Plan and profile views of a supplemental turning indicator assembly are shown in FIGS. 2c and 2d, respectively. The supplemental turning indicator assembly 240a, 240c, 240d comprises a first light source 241c, 241d; a second light source 242c, 242d; a third light source 243c, 243d; a fourth light source 244c, 244d; a fifth light source 245c, 245d; a sixth light source 246c, 246d and a seventh light source 247c, 247d. Preferably, each light source is a LA E63B, Power TOPLED®, available from OSRAM Corporation, or an equivalent from Agilent, Cree, Nichia or others. In at least one embodiment wherein at least one white light source is desired it is preferable to use a NSCW 021 SMD type LED available from NICHIA Corporation, Tokushima-Ken, Japan. It should be understood that any of the light sources described in commonly assigned U.S. Pat. Nos. 5,803,579 and 6,335,548, as well as U.S. patent application Ser. No. 09/835,278, the disclosures of which are incorporated in their entireties herein by reference, may be employed, the disclosures of each is incorporated in its entirety herein by reference. Preferably, each light source comprises a lens 248c, 248d. Each light source has an associated optics block comprising a first collimating portion 244c1, a first deviator portion 244c3, a second collimating portion 244c2 and a second deviator portion 244c4. Further details of related supplemental turning indicator assembly and optics blocks features are described in detail herein. It should be understood that more than one light source may be associated with a given optics block or multiple optics blocks may be associated with an individual light source. It should also be understood that multiple optics blocks may be incorporated into a common structure as shown in FIGS. 2c-2h. It should be understood that it is desirable to design the circuit board and optics block such that the light source is within 0.5 mm of a desired distance away from the optics block. In at least one embodiment, the optics block provides both vertical and horizontal light ray direction control. It should be understood that the optics blocks of the present invention may be incorporated individually for blind spot indicators, security lights, keyhole/door illuminators and other vehicle indicators, illuminators and information displays. It should be understood that the circuit board with light sources and other electrical components may be conformal coated and, or, the optics block may be configured such that it is ultrasonically, friction or vibratorilly welded, heat staked or otherwise sealingly adhered to the circuit board and configured to totally enclose the related electrical components of the supplemental turning indicator assembly.

Figure 2E:
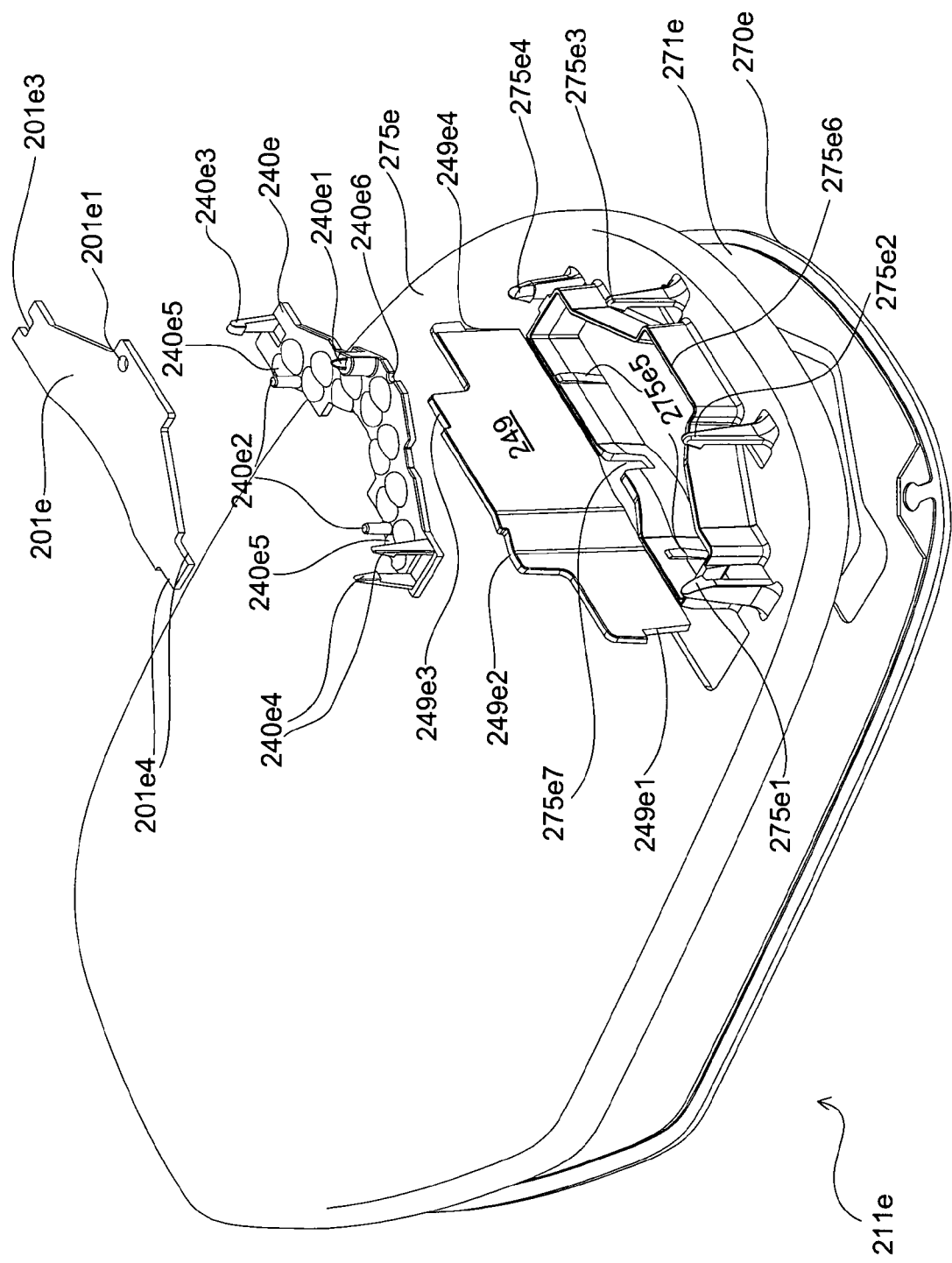
FIG. 2e depicts a perspective view of an exploded supplemental turning indicator assembly.
Figure 2F:
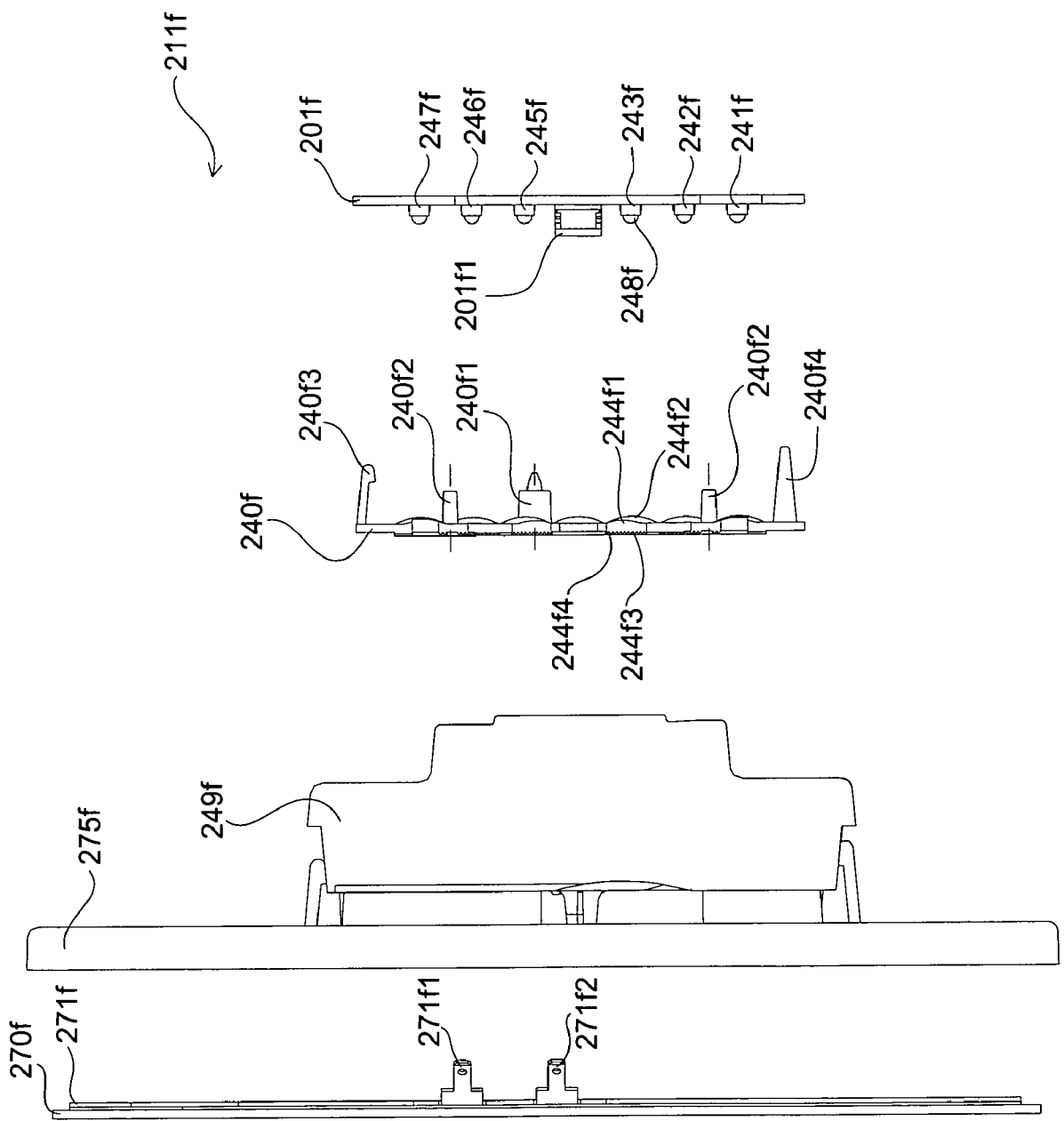
FIG. 2f depicts a profile view of the assembly of FIG. 2e.

With reference to FIGS. 2e and 2f, there is shown an embodiment of a rearview mirror assembly 211e, 211f comprising a supplemental turning indicator assembly. The supplemental turning indicator assembly comprises a printed circuit board 201e, 201f having an anti-rotation tab 201e4; an optics block alignment hole 201e1; an optics block alignment slot 201e3; first through seventh light sources 241f-247f and an electrical connector 201f1. Preferably, each light source has a lens 248f. The supplemental turning indicator assembly further comprises a combination optics block 240e, 240f having an alignment pin 240e1, 240f1; spacers 240e5, 240f5; anti-rotation clips 240e4, 240f4; an alignment slot clip 240e3, 240f3; optics block locators 240e5 and optics block positioner 240e6. Preferably, each optics block within the combination optics block 240e, 240f comprises a first collimating portion 244f1, a second collimating portion 244f2, a first deviator portion 244f3 and a second deviator portion 244f4. It should be understood that the optics block alignment hole cooperates with the alignment pin, the spacers cooperate with the circuit board, the alignment slot cooperates with the alignment slot clip and the anti-rotation tab cooperates with the anti-rotation clips to secure the circuit board in a desired relationship with respect to the combination optics block. It should be understood that accurate positioning of the light sources upon the circuit board is desirable to insure overall alignment with the associated optics block. It should also be understood that the optics block locators cooperate with the carrier locators 275e5 and the optics block positioner cooperates with the carrier positioner 275e6 to insure accurate alignment of the supplemental turning assembly with the carrier and ultimately with the heater, adhesive pad and corresponding mirror element. With further reference to FIGS. 2e and 2f, the rearview mirror assembly further comprises a carrier 275e, 275f having a living hinged lid 249e, 249f and first through fourth clips 275e1-275e4. The lid comprises first through fourth lid clip surfaces 249e1-249e4 that cooperate with the respective first through fourth clips to secure the supplemental turning indicator assembly within the carrier. A heater element 270e, 270f having first and second electrical connectors 271f1, 271f2, respectively, is positioned proximate the carrier along with adhesive 270e, 270f. In at least one embodiment, the heater comprises at least a portion aligned with the supplemental turning indicator assembly that comprises a light ray diffuser. Examples of various heaters are disclosed in U.S. Pat. Nos. 5,151,824, 6,244,716, 6,426,485, 6,441,943 and 6,356,376, the disclosures of each of these Patents are incorporated in their entireties herein by reference.

Figure 2G:
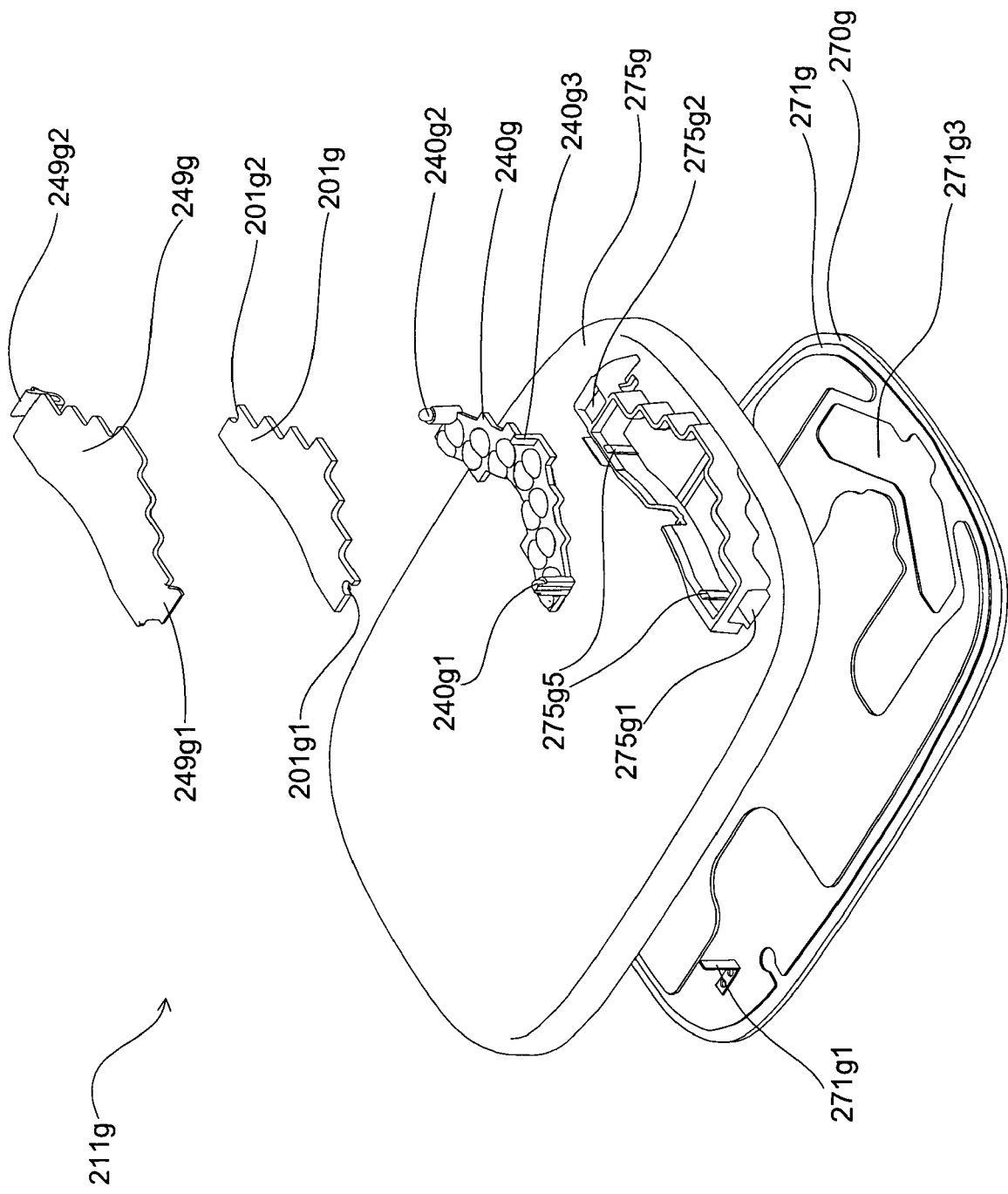
FIG. 2g depicts a perspective view of another exploded supplemental turning indicator assembly.
Figure 2H:
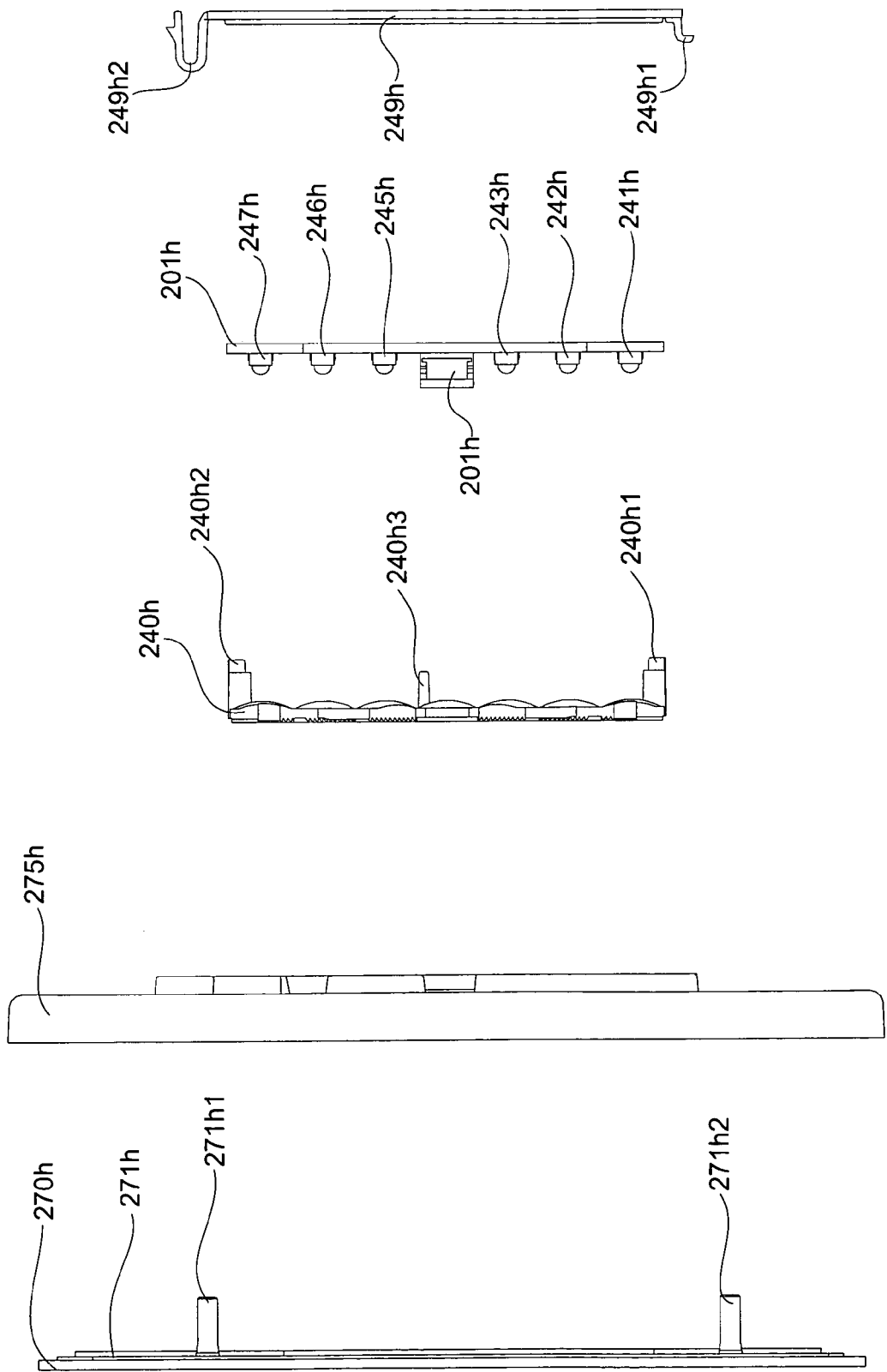
FIG. 2h depicts a profile view of the assembly of FIG. 2g.

With reference to FIGS. 2g and 2h, there is shown an embodiment of a rearview mirror assembly 211g, 211h comprising a supplemental turning indicator assembly. The supplemental turning indicator assembly comprises a printed circuit board 201g, 201h having an anti-rotation tab 201g1; an optics block alignment slot 201g2; first through seventh light sources 241h-247h and an electrical connector 201h1. The supplemental turning indicator assembly further comprises a combination optics block 240g, 240h having an anti-rotation pin 240g1, 240h1; a spacer 240g3, 240h3 and an alignment pin 240g2, 240h2; It should be understood that the spacer cooperates with the circuit board, the alignment slot cooperates with the alignment pin and the anti-rotation tab cooperates with the anti-rotation pin to secure the circuit board in a desired relationship with respect to the combination optics block. It should be understood that accurate positioning of the light sources upon the circuit board is desirable to insure overall alignment with the associated optics block. It should also be understood that the optics block locators cooperate with the carrier locators 275g5 to insure accurate alignment of the supplemental turning assembly with the carrier and ultimately with the heater, adhesive pad and corresponding mirror element. With further reference to FIGS. 2g and 2h, the rearview mirror assembly further comprises a carrier 275g, 275h having first and second clips 275g1-275g2. The lid 249g, 249h comprises first and second lid clips 249g1-249g2 that cooperate with the respective first and second clips to secure the supplemental turning indicator assembly within the carrier. A heater element 270g, 270h having first and second electrical connectors 271, g1271h1, 271h2, respectively, is positioned proximate the carrier along with adhesive 270g, 270h. In at least one embodiment, the heater comprises at least a portion aligned with the supplemental turning indicator assembly that comprises a light ray diffuser. Examples of various heaters are disclosed in U.S. Pat. Nos. 5,151,824, 6,244,716, 6,426,485, 6,441,943 and 6,356,376, the disclosures of each of these Patents are incorporated in their entireties herein by reference.

Figure 3A:
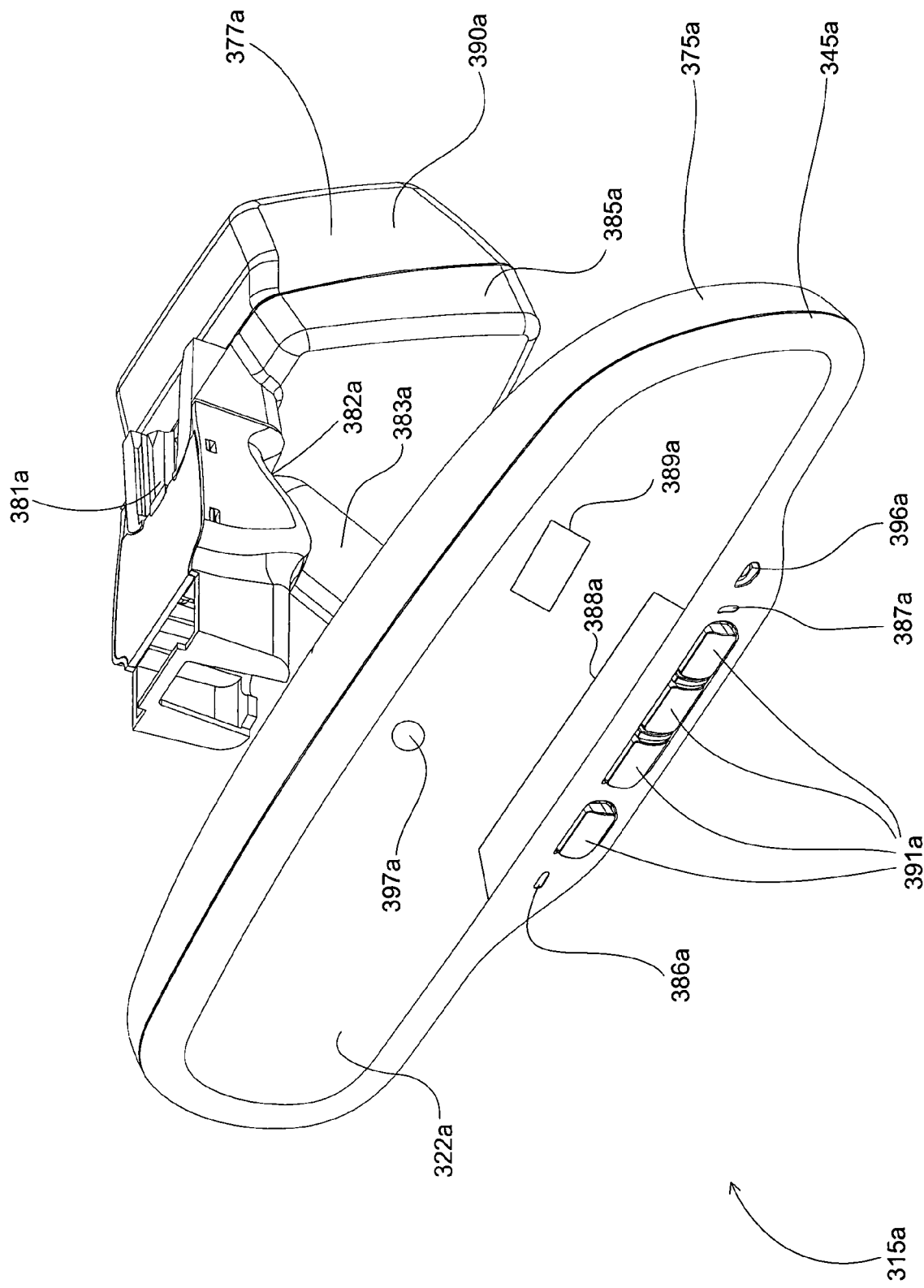
FIG. 3a depicts a perspective view of an interior rearview mirror assembly.
Figure 3B:
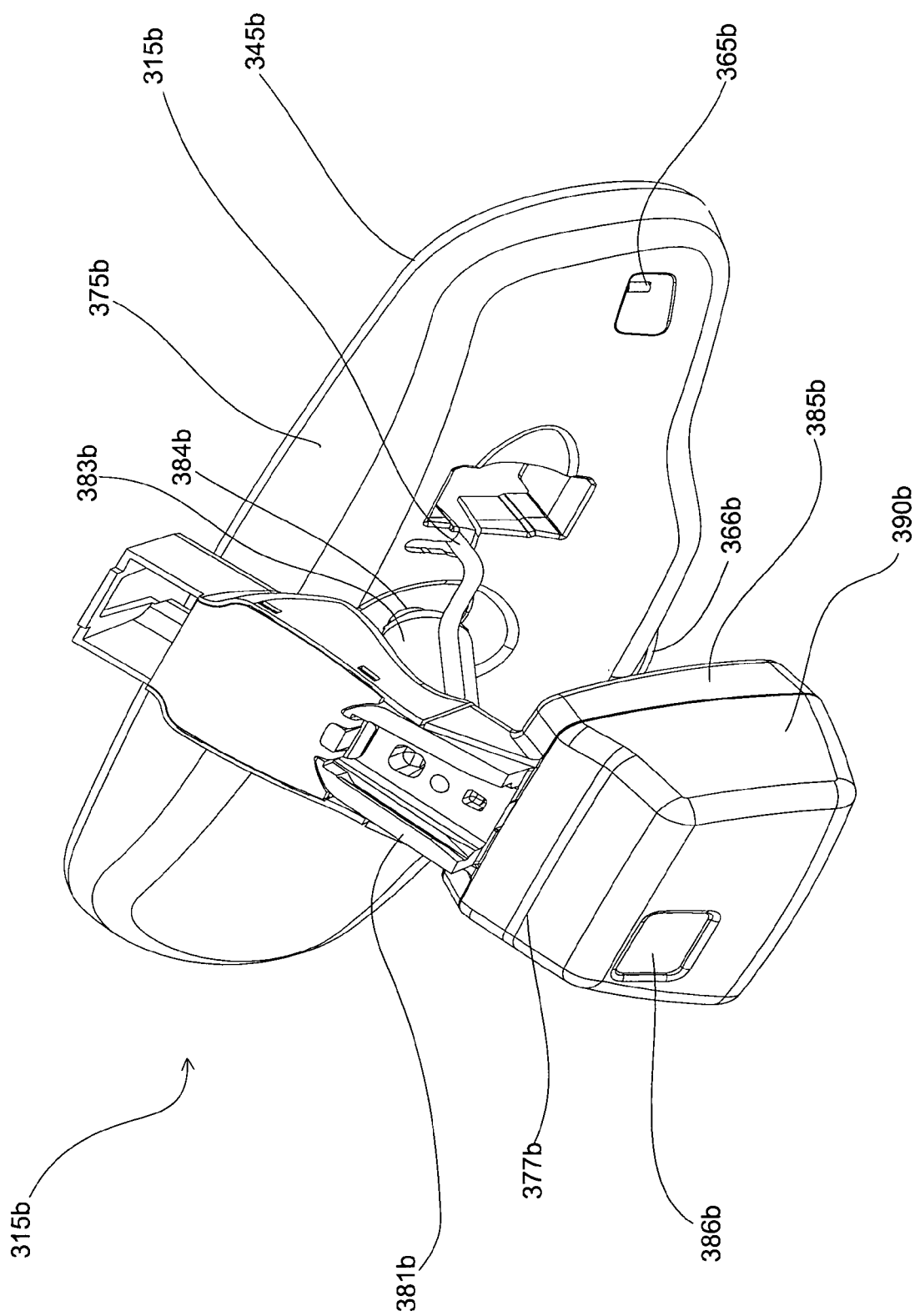

Turning now to FIGS. 3a and 3b a rearview mirror assembly 315a, 315b comprises a stationary housing 377a, 377b and a mirror housing 375a, 375b mounted to an attachment member 381a, 381b via a double ball stem 382a, 383a, 383b, 384b. The stationary housing comprises a rear portion 385a, 385b and a front portion 390a, 390b having a viewing window 386b. In at least one embodiment, the stationary housing comprises at least one imager, at least one automatic exterior light control module, at least one moisture sensor module, at least one compass sensor, at least one compass, at least one speaker, at least one microphone, at least one windshield wiper automatic control, at least one digital signal processor, at least one automatic defogger control, at least one collision avoidance control, at least one lane departure warning module, at least one electro-optic mirror element control module, at least one supplemental illuminator module, at least one photo sensor, at least one processor, any one thereof, a subcombination thereof or combination thereof. Preferably, the mirror assembly comprises a mirror element 322a and a bezel 345a, 345b. In at least one embodiment, the mirror housing comprises at least one imager, at least one automatic exterior light control module, at least one moisture sensor module, at least one compass sensor, at least one compass, at least one speaker, at least one microphone, at least one windshield wiper automatic control, at least one digital signal processor, at least one digital sound processor, at least one GPS system, at least one navigation system, at least one automatic defogger control, at least one collision avoidance control, at least one lane departure warning module, at least one electro-optic mirror element control module, at least one supplemental illuminator module, at least one photo sensor, at least one processor, any one thereof, a subcombination thereof or combination thereof. Preferably, the mirror assembly further comprises at least one ambient light sensor 365b, at least one microphone 366b and at least one interconnecting cable 315b for electrical communication from the mirror housing to the stationary housing. It should be understood that a second interconnecting cable may be provided for electrical communication from the mirror assembly to the vehicle and, or, at least one other rearview mirror assembly. The interconnecting cable, or cables, may be configured to route, at least partially, through the double ball stem, therefore, are at least partially covert. Preferably, the mirror assembly comprises at least one information display 388a, 389a, a first indicator 386a, at least a second indicator 387a, at least one glare light sensor 396a, at least one second glare sensor 397a, an illuminator, any one thereof, a subcombination thereof or combination thereof. In at least one embodiment, at least one indicator, illuminator, information display, photo sensor, subcombination thereof or combination thereof is positioned behind the mirror element with respect to a viewer. It should be understood that the optics blocks described herein may be employed with any of these device to control the direction of the associated light rays. Exterior light control systems as described in commonly assigned U.S. Pat. Nos. 5,990,469; 6,008,486; 6,130,421; 6,130,448; 6,255,639; 6,049,171;

5,837,994; 6,403,942; 6,281,632; 6,291,812; and U.S. patent application Ser. Nos. 09/448,364; 09/538,389; 09/605,102; 09/678,856; 09/800,460; 09/847,197; 09/938,774; 09/491,192; 60/404,879; 10/235,476; and 10/208,142, the disclosures of which are incorporated in their entireties herein by reference, may be incorporated in accordance with the present invention. Examples of microphones for use with the present invention are described in commonly assigned U.S. patent application Ser. Nos. 09/144,176 and 10/076,158, the disclosures of which are incorporated in their entireties herein by reference. Various indicators for use with the present invention are described in commonly assigned U.S. Pat. Nos. 5,803,579 and 6,335,548, as well as commonly assigned U.S. patent application Ser. No. 09/835,278, the disclosures of which are incorporated in their entireties herein by reference. Preferred light sensors for use within the present invention are described in detail in commonly assigned U.S. Pat. Nos. 5,923,027 and 6,313,457, the disclosures of which are incorporated in their entireties herein by reference. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference. It should be understood that the mirror assembly may incorporate light-sensing electronic circuitry of the type illustrated and described in the above-referenced Canadian Patent No. 1,300,945, U.S. Pat. Nos. 5,204,778, 5,451,822, 6,402,328, or 6,386,713 and other circuits capable of sensing glare and ambient light and supplying a drive voltage to the electro-optic element, the disclosures of which are incorporated in their entireties herein by reference. Moisture sensors and windshield fog detector systems are described in commonly assigned U.S. Pat. Nos. 5,923,027 and 6,313,457, the disclosures of which are incorporated in their entireties herein by reference.

Figure 4A:
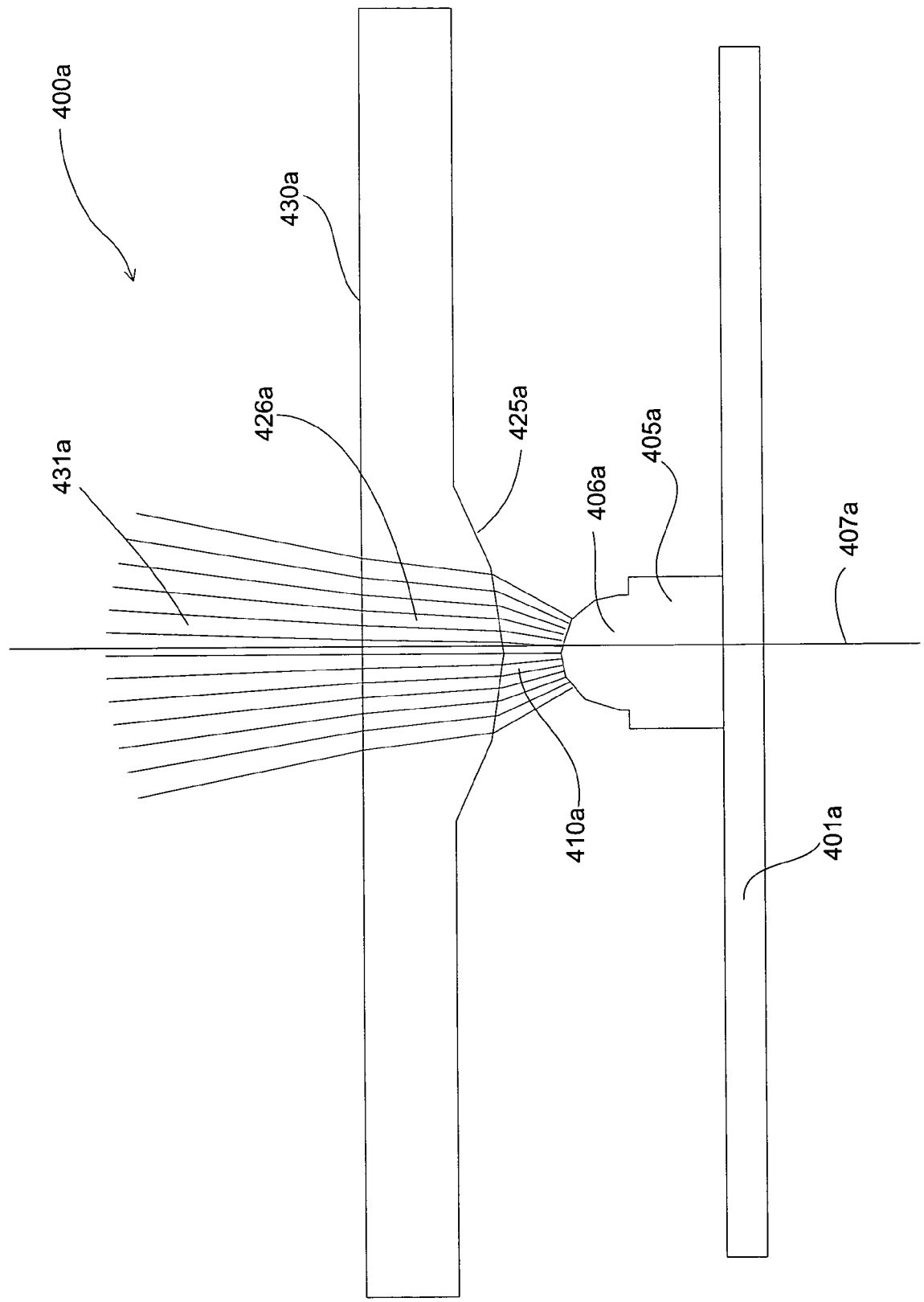
FIG. 4a depicts an indicator assembly.
Figure 4B:
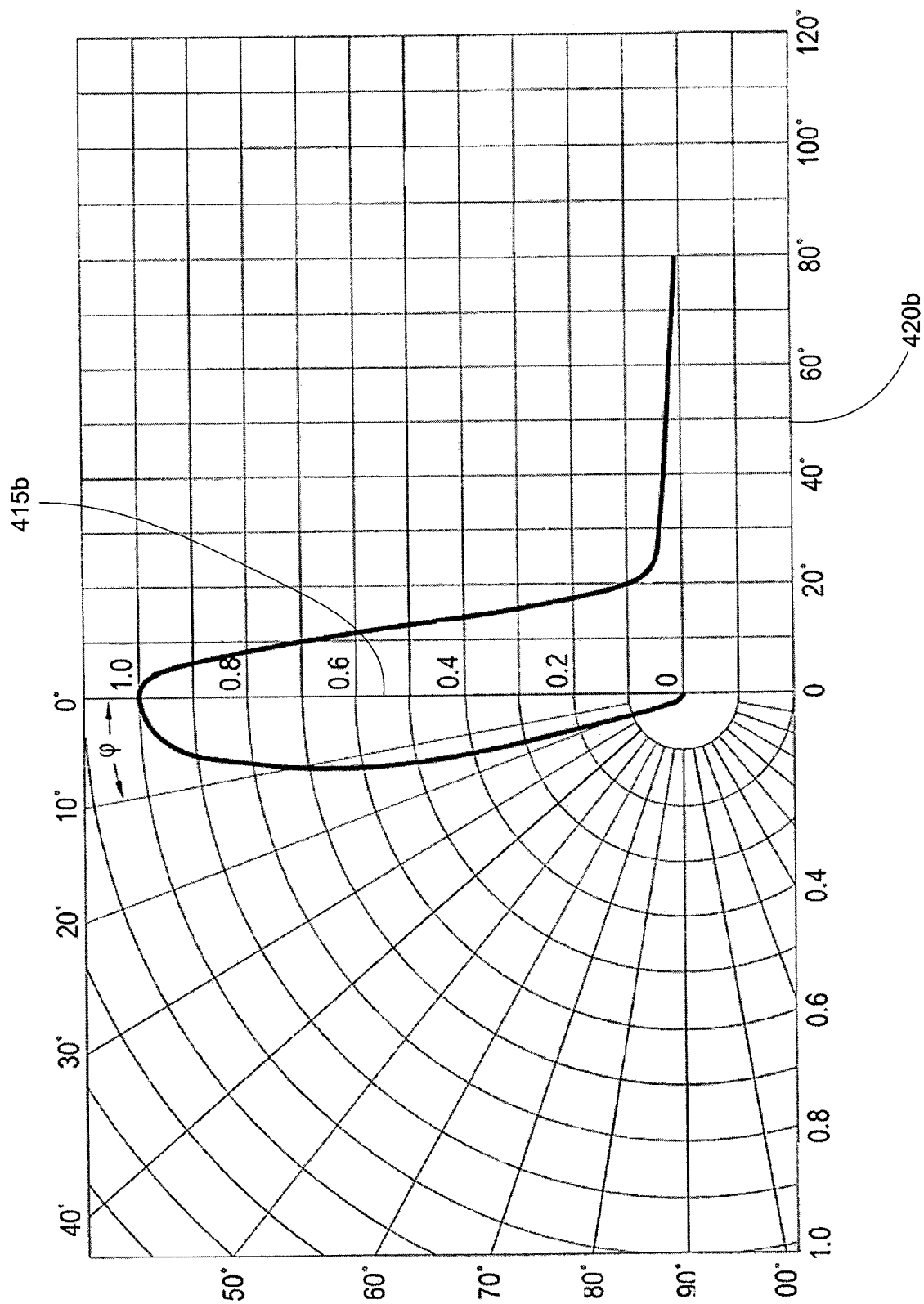
FIG. 4b depicts a graph of a light source radiation characteristic.

Turning now to FIGS. 4a and 4b, a light source 405a, having a lens 406a, is depicted to be mounted to a circuit board 401a. A typical light source will emit light rays 410a in a pattern as depicted. The x-axis of FIG. 4b represents the angular viewing position relative to the central optical axis of the light source and the y-axis represents a normalized radiation characteristic of the light source. As can be seen, light rays emitted by a typical light source will be minimally visible beyond some given viewing angle with respect to a central optical axis 407a. Preferably, an optics block is provided with a concentrating portion 425a to redirect light rays 410a to substantially concentrated light rays 426a. In at least one embodiment, the optics block comprises a deviator portion 430a to redirect light rays 426a to a desired light ray 431a direction. As can be seen, the optics block of FIG. 4a may be incorporated in a rearview mirror indicator assembly, illuminator assembly or information display assembly to control the vertical direction of light rays in a condensing fashion. The light source, circuit board and optics block form a light assembly 400a. In at least one embodiment, the optics block is configured to direct substantially all of the associated light rays to define a vertical viewing angle approximately −5° and approximately 5° (+approximately 4° to approximately 5°/−approximately 2° to approximately 3°) with respect to a central optical axis.

Figure 5:
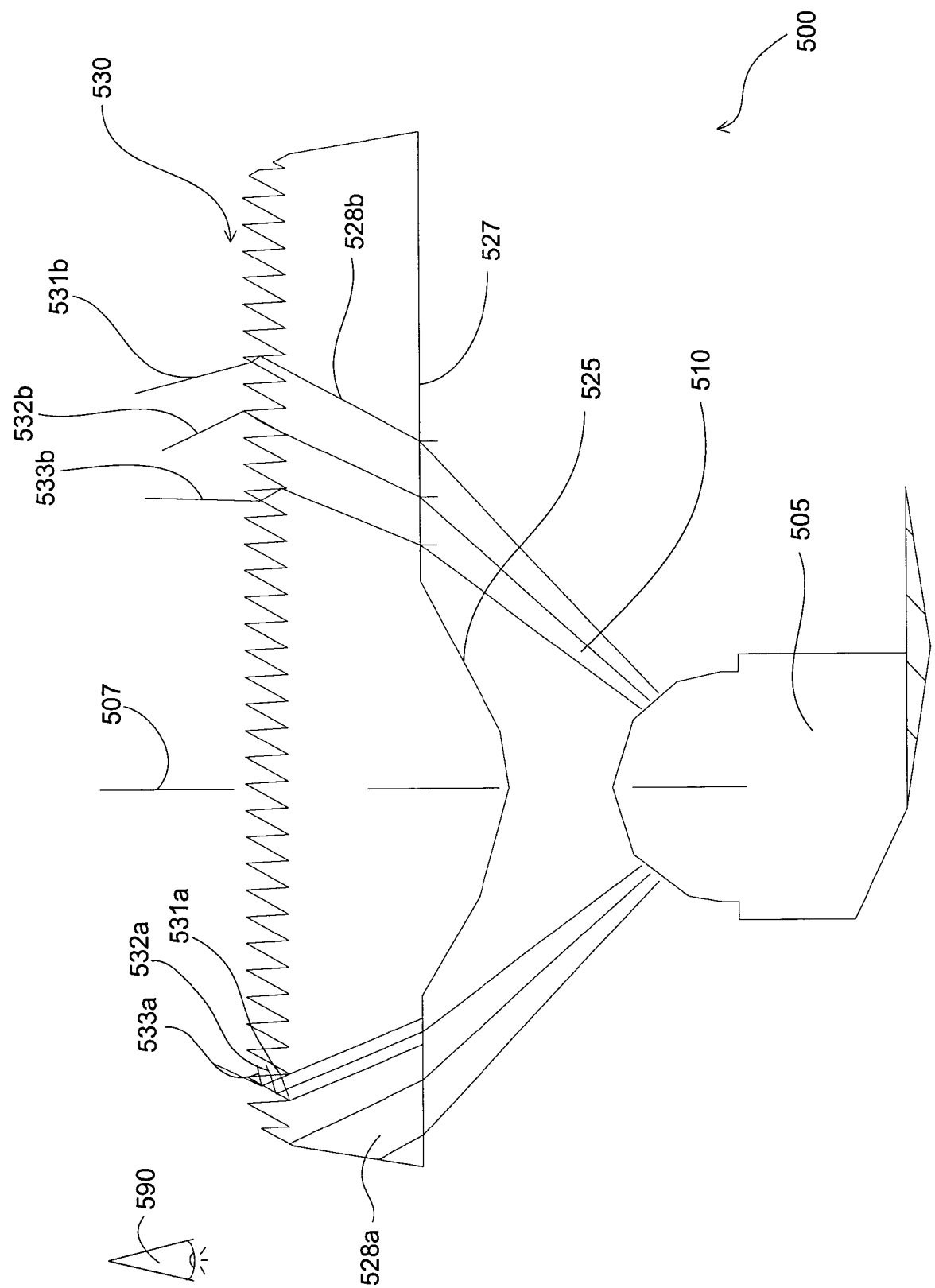
FIG. 5 depicts a light ray tracing.
Figure 6:
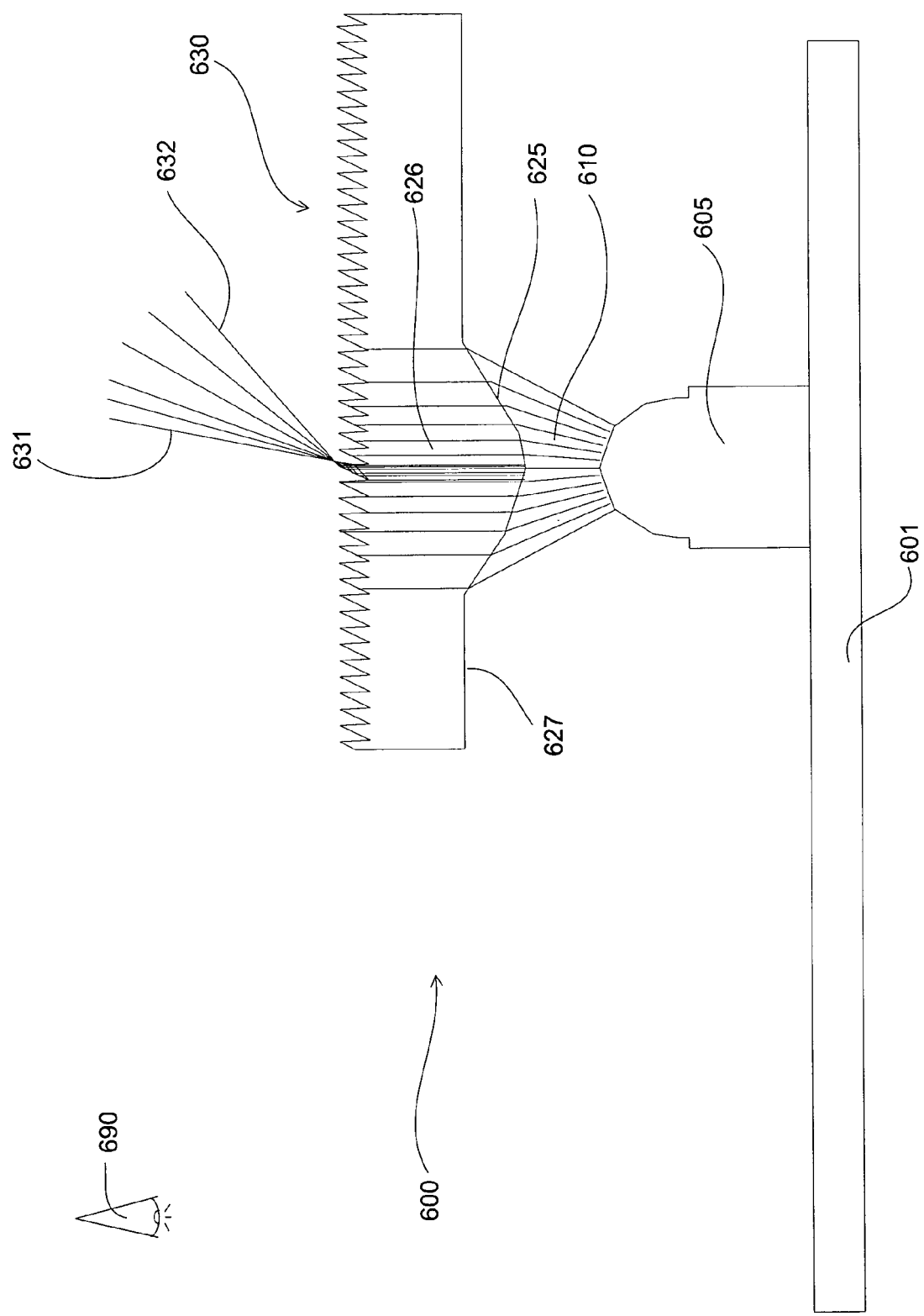
FIG. 6 depicts a second light ray tracing.

Turning now to FIGS. 5 and 6, there is shown a light source 505, 605 mounted to a circuit board 601 to define a central optical axis 507. An optics block incorporating a collimating portion 525, 625 and a deviator portion 530, 630 is provided to control the direction of the light rays preferably away from the driver's eye 590, 690. As can be seen, the light rays 626 that pass through the collimating portion are redirected substantially parallel to the central optical axis, however, light rays 528a, 528b that pass through the non-collimating portion 527, 627 are not so redirected. As can be seen, the light rays 528a result in reflected light rays 531a, 532a, 533a directed toward an undesirable portion of deviator surface 530. Similarly, light rays 528b are reflected and refracted light rays 531b, 532b, 533b directed toward an undesirable direction. Some of the light rays 510, 610 are actually directed toward the driver's eye. It should be understood that secondary optics blocks may be added to further redirect the light rays 528a, 528b. With further reference to FIG. 6, it can be seen that the light rays 626 that have been redirected substantially parallel to the central optical axis result in light rays 631, 632 that are redirected substantially as desired. As can be appreciated, this configuration does not result in a majority of the light rays emitted from the light source being redirected as desired. The light source 505, 605; circuit board 601 and the optics block form a light assembly 500, 600. In at least one embodiment, the collimating portion collimates light rays horizontally and redirects (concentrates) light rays vertically. Preferably, total internal reflections (TIR) optics form light rays horizontally in the outboard direction relative to the controlled vehicle. In at least one embodiment, the optics block is configured to direct substantially all of the associated light rays to define a vertical viewing angle approximately −5° and approximately 5° (+approximately 4° to approximately 5°/−approximately 2° to approximately 3°) with respect to a central optical axis. In at least one embodiment, a minimum of approximately 5 candelas are present at approximately 5°, approximately 4 candelas at approximately 10° and approximately 3 candelas at approximately 15°, all angles with respect to a central optical axis.

Figure 7:
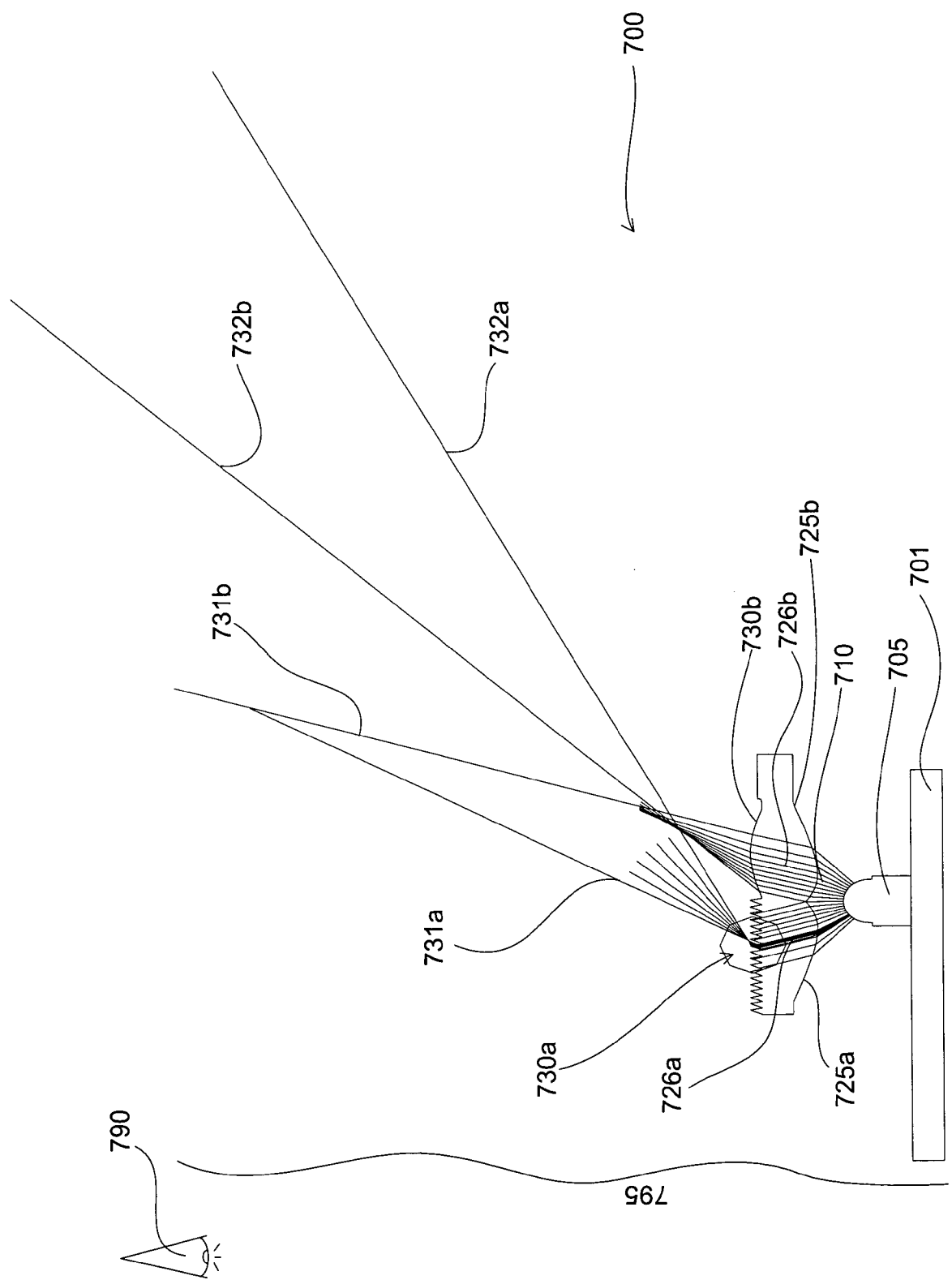
FIG. 7 depicts a third light ray tracing.

With reference to FIG. 7, a light source 705 is mounted to a circuit board 701 such that light rays 710 are emitted toward an optics block. Preferably, the optics block comprises a first collimating portion 725a to redirect a portion of the light rays 710 as partially collimated light rays 726a toward a first deviator portion 730a resulting in light rays 731a, 732a. Preferably, the optics block comprises a second collimating portion 725b to redirect a portion of the light rays 710 as partially collimated light rays 726b toward a second deviator portion 730b resulting in light rays 731b, 732b. As can be seen, substantially all of the light rays emitted from the light source are redirected as desired away from the driver's eye 790 and toward a blind spot. The light source, the circuit board and the optics block form a light assembly 700. Preferably, the first collimating portion 725a directs partially collimated light rays 726a approximately 15° inboard, toward, the controlled vehicle 795 with respect to the central optical axis of the associated light source. The first collimating portion may be configured as a curved lens surface defining either a radial, an elliptical, a hyperbolic, a parabolic or a complex shape. As described in more detail elsewhere herein, the first deviator portion 730a is preferably configured to refract substantially all of the partially collimated light rays 726a approximately 45° (+/− approximately 17°) outboard, away, from the controlled vehicle with respect to the central optical axis of the associated light source. Preferably, the second collimating portion 725b directs partially collimated light rays 726b approximately 15° outboard, away, from the controlled vehicle with respect to the central optical axis of the associated light source. The second collimating portion may be configured as a curved lens surface defining either a radial, an elliptical, a hyperbolic, a parabolic or a complex shape. The second deviator portion 730b is preferably configured to redirect substantially all of the partially collimated light rays 726b approximately 29° (+/−approximately 14°)

outboard, away, from the controlled vehicle with respect to the central optical axis of the associated light source. These two groups of light rays combine to define a beam pattern that is approximately 32° (+approximately 15°/–approximately 10°) with respect to a central optical axis.

Figure 8:
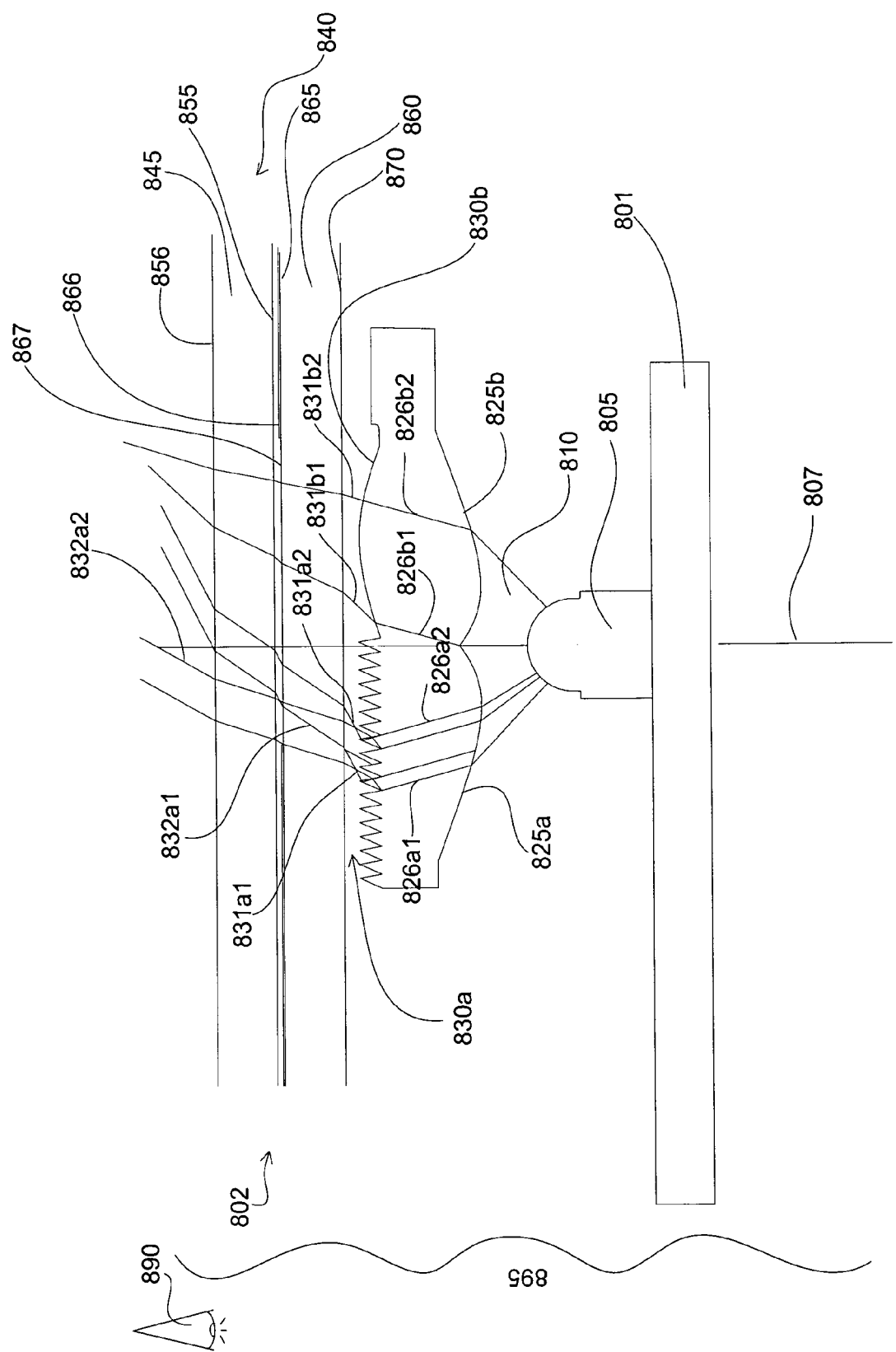
FIG. 8 depicts a fourth light ray tracing.

Turning now to FIG. 8, a mirror assembly 802 is depicted to comprise a light assembly comprising a light source 805, a circuit board 801 and an optics block similar to that shown in FIG. 7. In this embodiment, a portion of the light rays 810 are redirected via a first collimating portion 825a to form at least partially collimated light rays 826a1, 826a2. Light rays 826a1 are redirected by a first deviator portion 830a to form light rays 831a1, 832a1. Light rays 826a2 are redirected by the first deviator to form light rays 831a2, 832a2. A portion of the light rays 810 are redirected via a second collimating portion 825b to form light rays 826b1, 826b2. Light rays 826b1 are redirected via a second deviator portion 830b to form light rays 831b1. Light rays 826b2 are redirected via the second deviator portion to form light rays 831b2. Preferably, substantially all of the light rays 810 emitted by the light source pass through the area 867 defined in an associated mirror element 840 reflective stack 866. Preferably, the mirror element further comprises a first substrate 845, having a first surface 850 and a second surface 855, and a second substrate 860, having a third surface 865 and a fourth surface 870. It should be understood that in at least one embodiment, the mirror element is a prismatic mirror comprising a single substrate through which the associated light rays pass. As can be seen, the majority of the light rays 810 are directed outboard of the controlled vehicle 895 and away from the driver's eye 890. In at least one embodiment, the area 867 defines a window having a higher transmissivity than the remainder of the reflective stack 866. With this window configuration in combination with aligning the light source and optics block as depicted in FIG. 8 and described with regard to FIGS. 2e02h, approximately half of the first deviator portion 830a is out of alignment with respect to the window area. Since the second collimating portion and the second deviator portion direct substantially all of the related light rays 826b1, 826b2, 831b1, 831b2 outboard, away, from the controlled vehicle and the half of the first collimating portion. Combined with the first deviator portion, most susceptible to producing stray light rays, being out of alignment with respect to the window, very little, if any, light rays 826a1, 826a2, 831b1, 831b2 are visible to the driver of the controlled vehicle. It should be understood that substantially the entire reflective stack 866, including the area 867, may be configured to be similarly, if not identically, at least partially transmissive, may have alternating areas of differing transmissivity in the area 867, or may comprise any of the configurations as described in commonly assigned U.S. Pat. Nos. 5,682,267, 5,689,370, 6,064,509, 6,062,920, 6,268, 950, 6,195,194, 5,940,201, 6,246,507, 6,057,956, 6,512,624, 6356,376, 6,166,848, 6,111,684, 6,193,378, 6,239,898, 6,441,943, 6,037,471, 6,020,987, 5,825,527 6,111,684 and 5,998,617, the disclosures of each of these Patents are incorporated in their entireties herein by reference.

Figure 9:
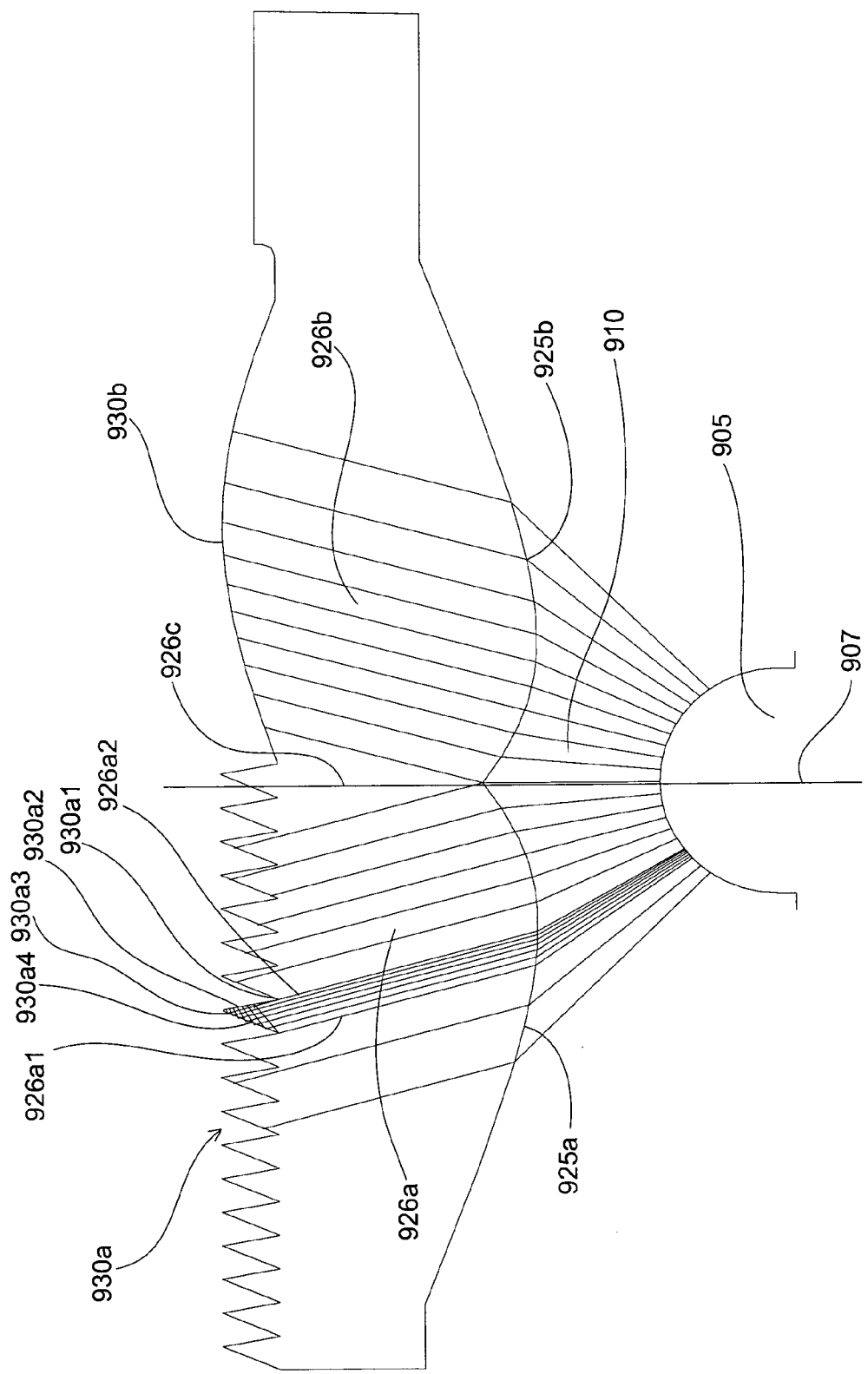
FIG. 9 depicts a portion of the light ray tracing of FIG. 7.

With reference to FIG. 9, there is shown a light source 905 in relation to an optics block similar to those shown in FIGS. 7 and 8. The optics block comprises a first collimating portion 925a configured to redirect a portion of light rays 910 as partially collimated light rays 926a. In at least one embodiment, the angle defined by the first deviator segment 930a2 with respect to the central optical axis 907 is less than the angle of the partially collimated light rays 926a1, 926a2, such that the portion of partially collimated light rays 926a that pass deviator edge 930a1 do not impinge on the second deviator segment 930a3 and are reflected by the third deviator segment 930a4 and refracted by the first deviator segment 930a2. Preferably, as described in detail elsewhere herein, deviator segment 930a4 forms an angle with respect to the central optical axis 907 such that even light rays 926a1 clear adjoining deviator segments and edges. In a preferred embodiment, a null zone 926c is defined to minimize light ray cross-over from the second collimating portion to the first deviator portion and from the first collimating portion to the second deviator portion.

Figure 10:
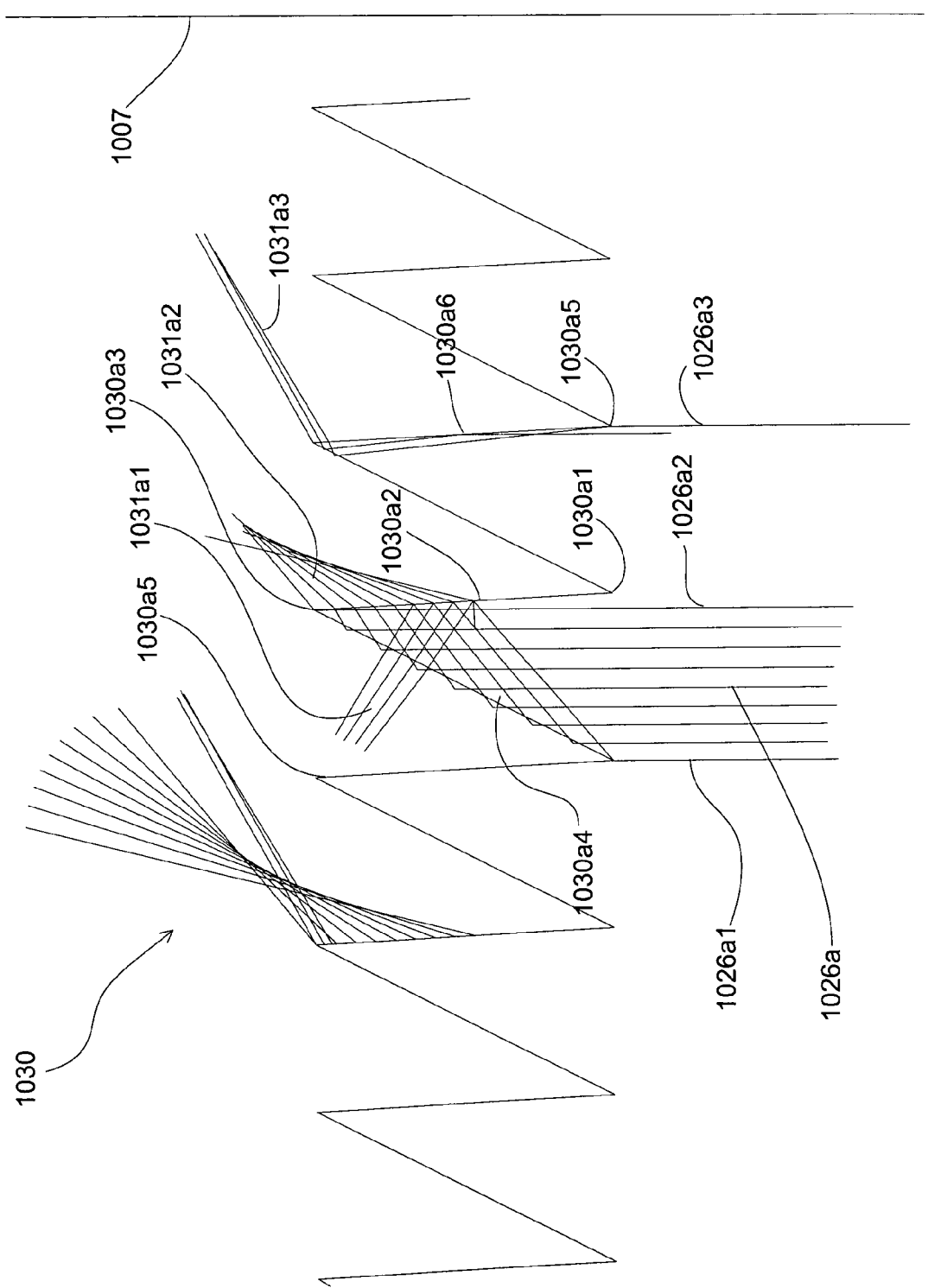
FIG. 10 depicts a magnified view of various light ray tracing details.

Turning now to FIG. 10, there is shown an enlarged view of a portion of a first deviator portion 1030. As can be seen in this embodiment, the angle defined by the first deviator segment 1030a2 with respect to the central optical axis 1007 is greater than the angle defined by the partially collimated light rays 1026a resulting in the light rays 1026a3 passing the adjoining deviator edge 1030a5 and impinging upon the adjoining second deviator segment 1030a6, resulting in stray light rays 1031a3. This configuration causes a significant amount of the associated light rays to be reflected off the first deviator segment (preferably, refracting surface) 1030a2, through the third deviator segment (preferably, reflecting surface) 1030a4, inboard toward the driver of the controlled vehicle. Light rays may be bounced off refracting surfaces, off reflecting surfaces and then refract outboard, away, from the controlled vehicle at a greater angle than desired. As well known, when light rays 1026a approach the angle of total internal reflection (TIR), the light rays are refracted and reflected according to the Fresnel equations. The configuration depicted in FIG. 10, with its relatively wide deviator pattern, results in a portion of the partially collimated light rays 1026a are reflected off segment 1030a4 toward segment 1030a2. These light rays are close to a TIR angle, reflected light rays 1031a1 will impinge upon the adjoining first deviator segment 1030a5.

Figure 11:
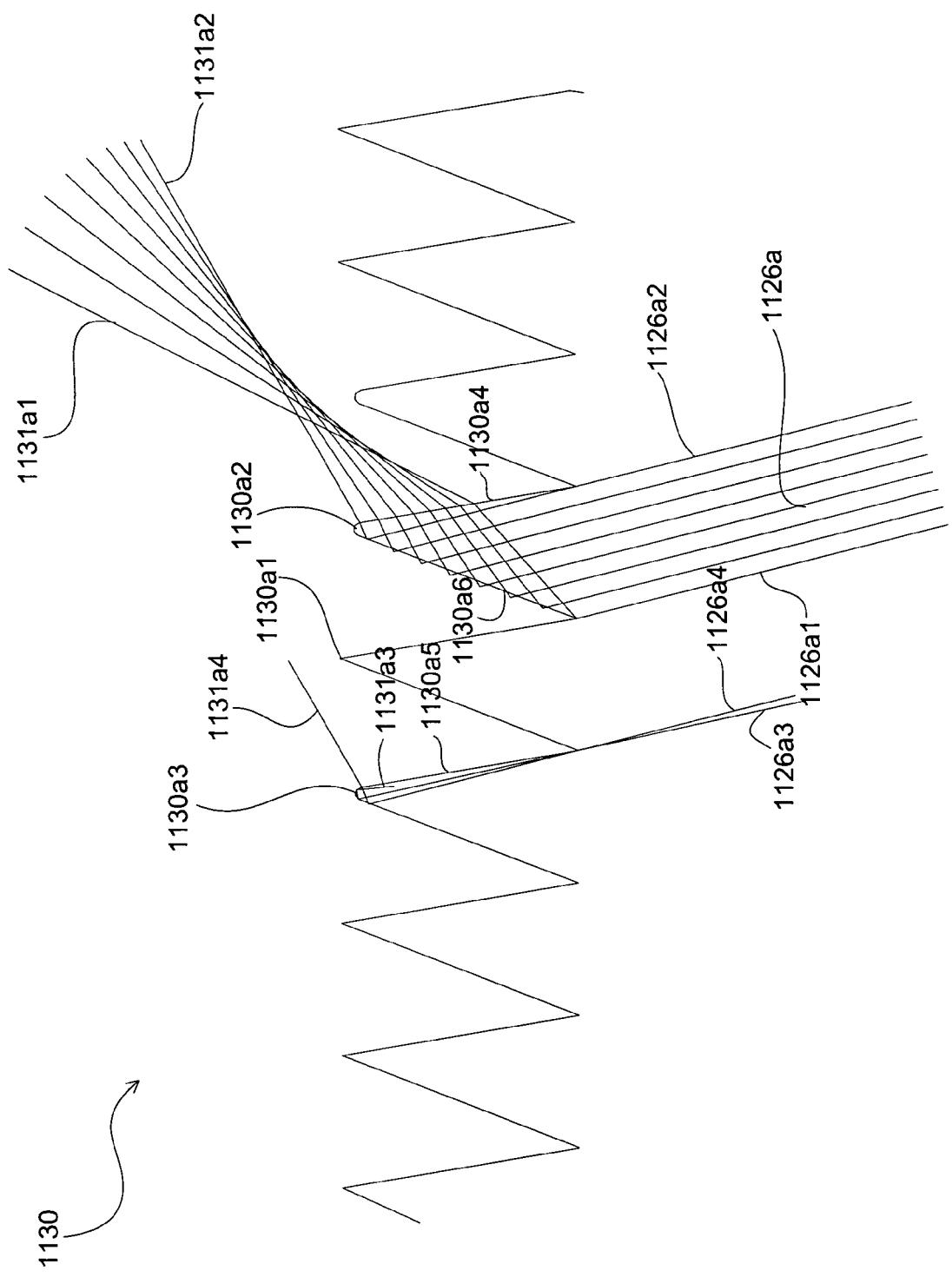
FIG. 11 depicts a second magnified view of various light ray tracing details.

FIG. 11 depicts another enlarged view of a first deviator portion 1130. As can be seen the first and second deviator segments 1130a2, 1130a3, respectively, define a less pointed shape compared to the second deviator segment 1130a1. Due to optics block molding and forming, the second deviator segment may define a more rounded shape. As can be seen, when the light rays 1126a form a desired angle with respect to the third deviator segment 1130a4 light rays 1126a1, 1126a2 are redirected as light rays 1131a1, 1131a2, respectively, as desired. However, when the light rays 1126a form an incorrect angle with respect to the adjoining third deviator segment 1130a5 a portion of the light rays 1126a3 will impinge upon adjoining deviator segments 1130a3 and become totally internally reflected light rays 1131a3. Only a portion of the light rays 1126a4 will be directed as desired light rays 1131a4. In at least one embodiment, the third deviator segment 1130a6 defines a slight convex curve such that substantially all of the light rays 1126a1,1126a2 are directed as desired to clear all other optics block segments and edges.

Figure 12:
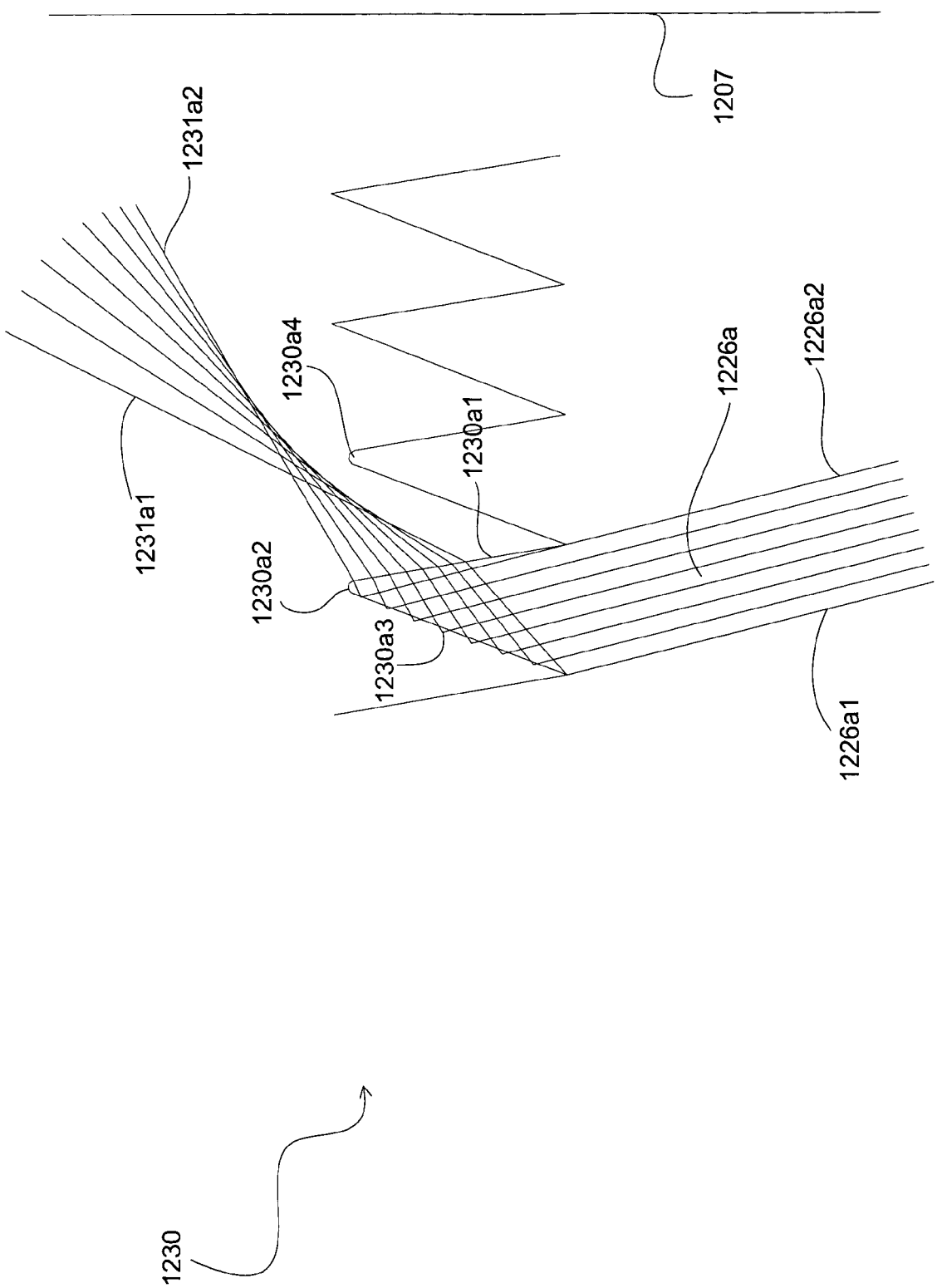
FIG. 12 depicts a magnified view of a portion of the light ray tracing of FIG. 11.

Turning now to FIG. 12, another enlarged view of a first deviator portion 1230 is depicted. Preferably, the first deviator segment 1230a1 forms a smaller angle with respect to the central optical axis 1207 compared to an angle of the light rays 1226a, such that the light rays 1226a1, 1226a2 are redirected as light rays 1231a1,1231a2, respectively, as desired. In at least one embodiment, the second deviator segment 1230a2 defines a substantially rounded shape and the third deviator segment 1230a3 defines a slightly convex curve. This configuration results in substantially all light rays 1226a clearing the adjoining second deviator segment 1230a4.

Figure 13:
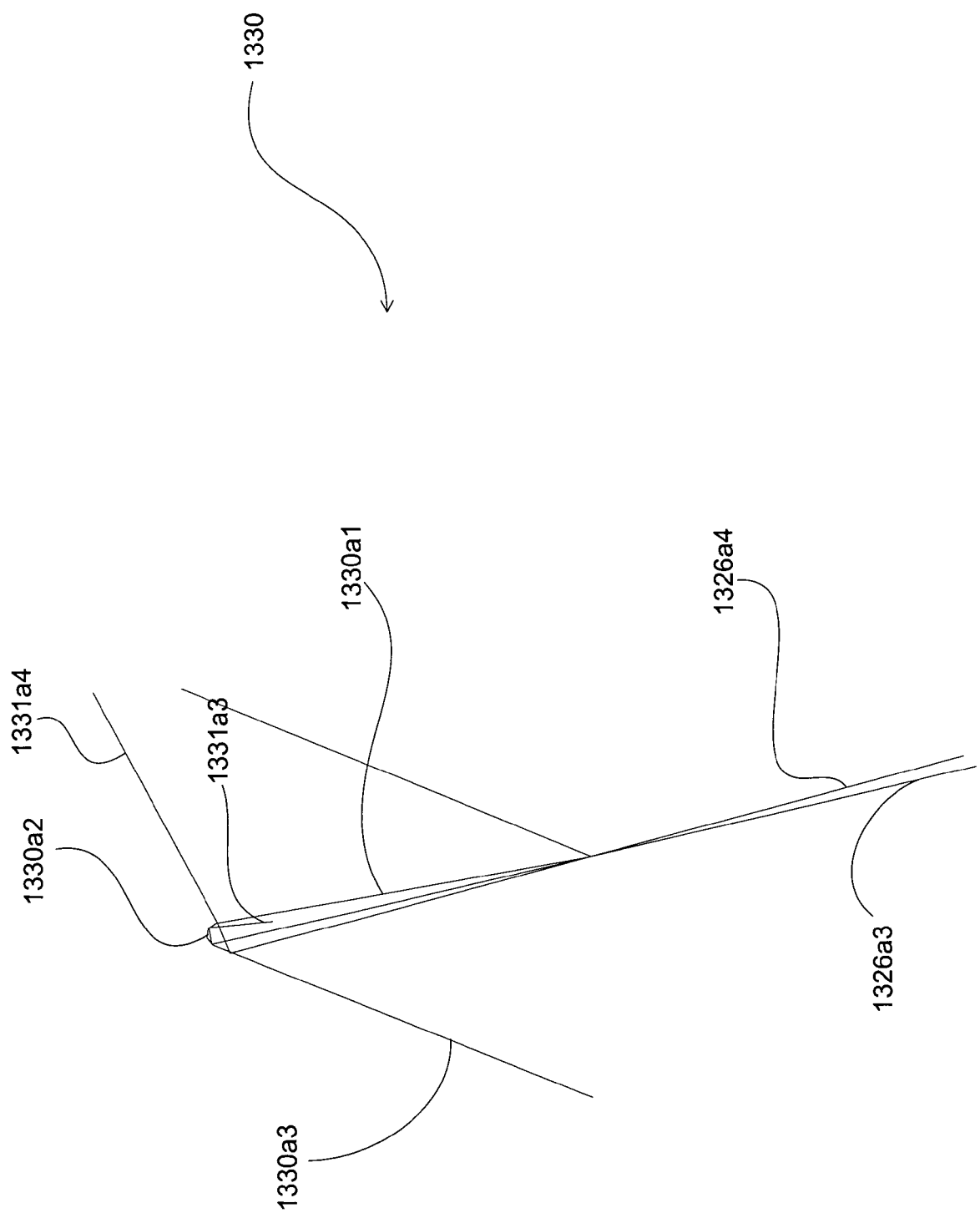
FIG. 13 depicts a magnified view of a second portion of the light ray tracing of FIG. 11.

FIG. 13 depicts another enlarged view of a first deviator portion 1330 having a first deviator segment (preferably, refraction portion) 1330a1, a second deviator segment (preferably, rounded portion) 1330a2 and slightly convex shaped third deviator segment 1330a3. In at least one embodiment, the refraction portion 1330a1 forms an angle that is greater than 5° less than the angle formed by the light rays 1326a4 such that light rays 1331a4 with respect to a central optical axis are emitted in the desired direction. When the light rays 1326a3 are less than 5° less than the angle formed by the first deviator segment, there is a potential for total internally reflected light rays 1331a3 being produced.

Figure 14A:
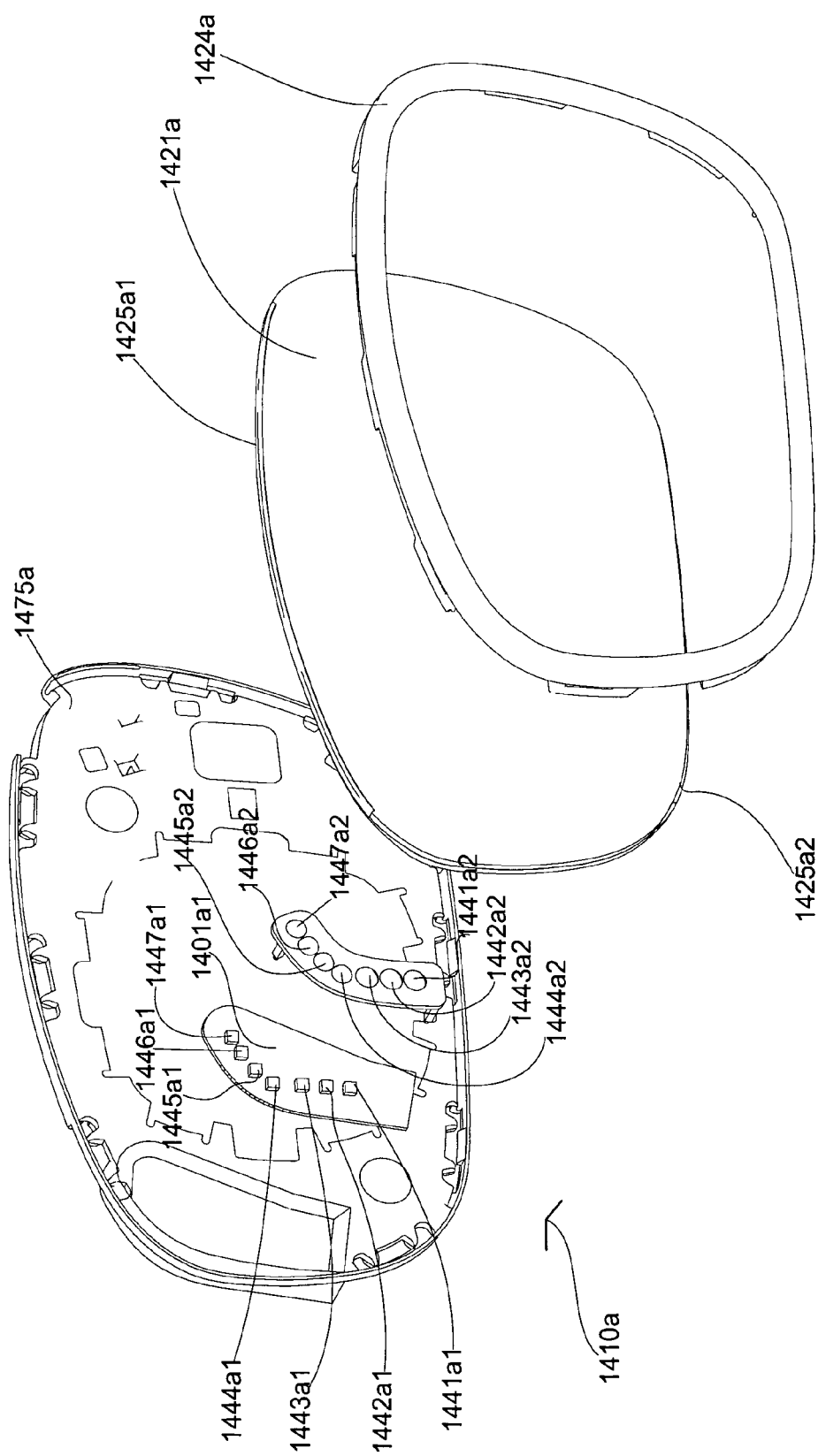
Figure 14B:
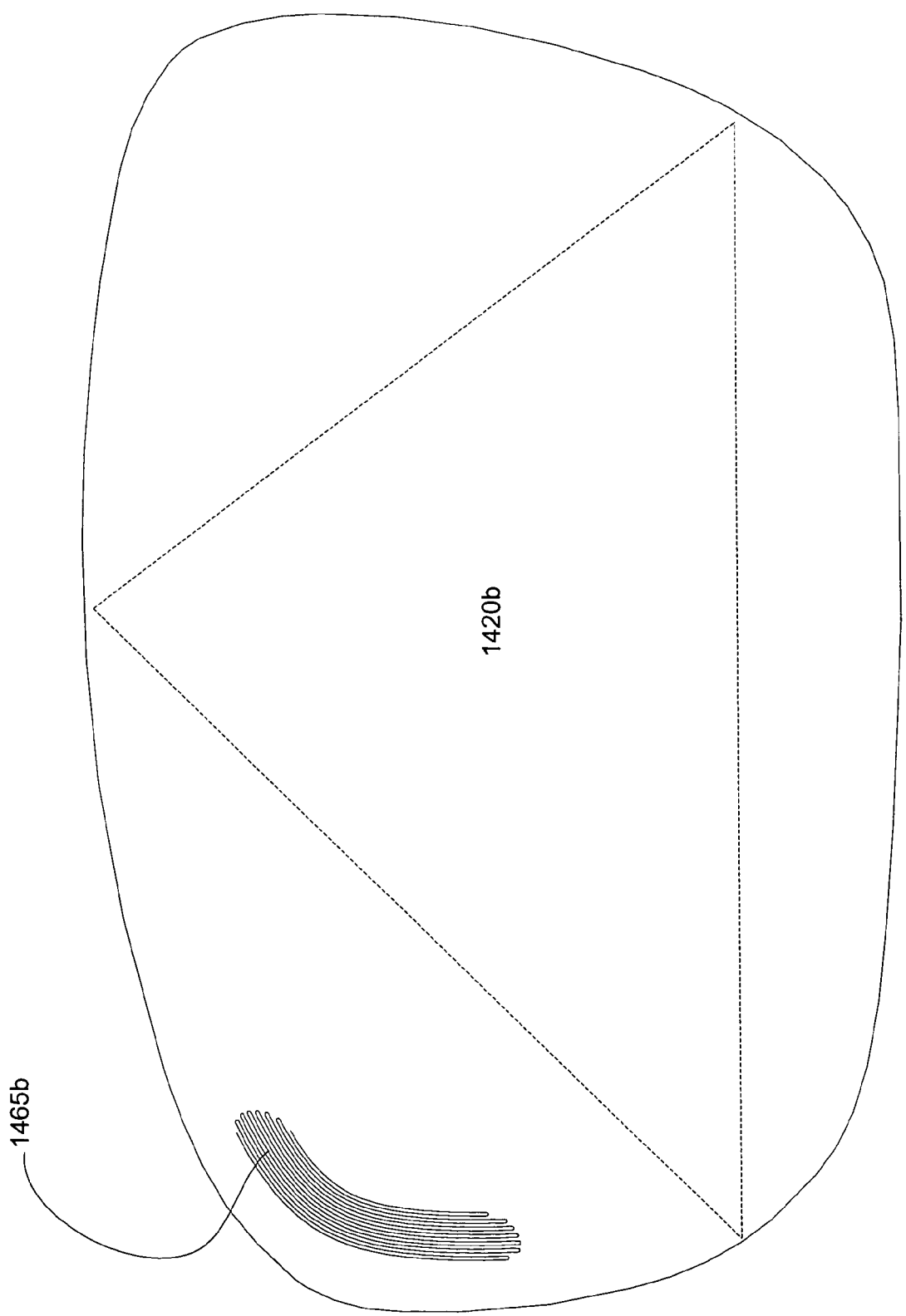
Figure 14D:
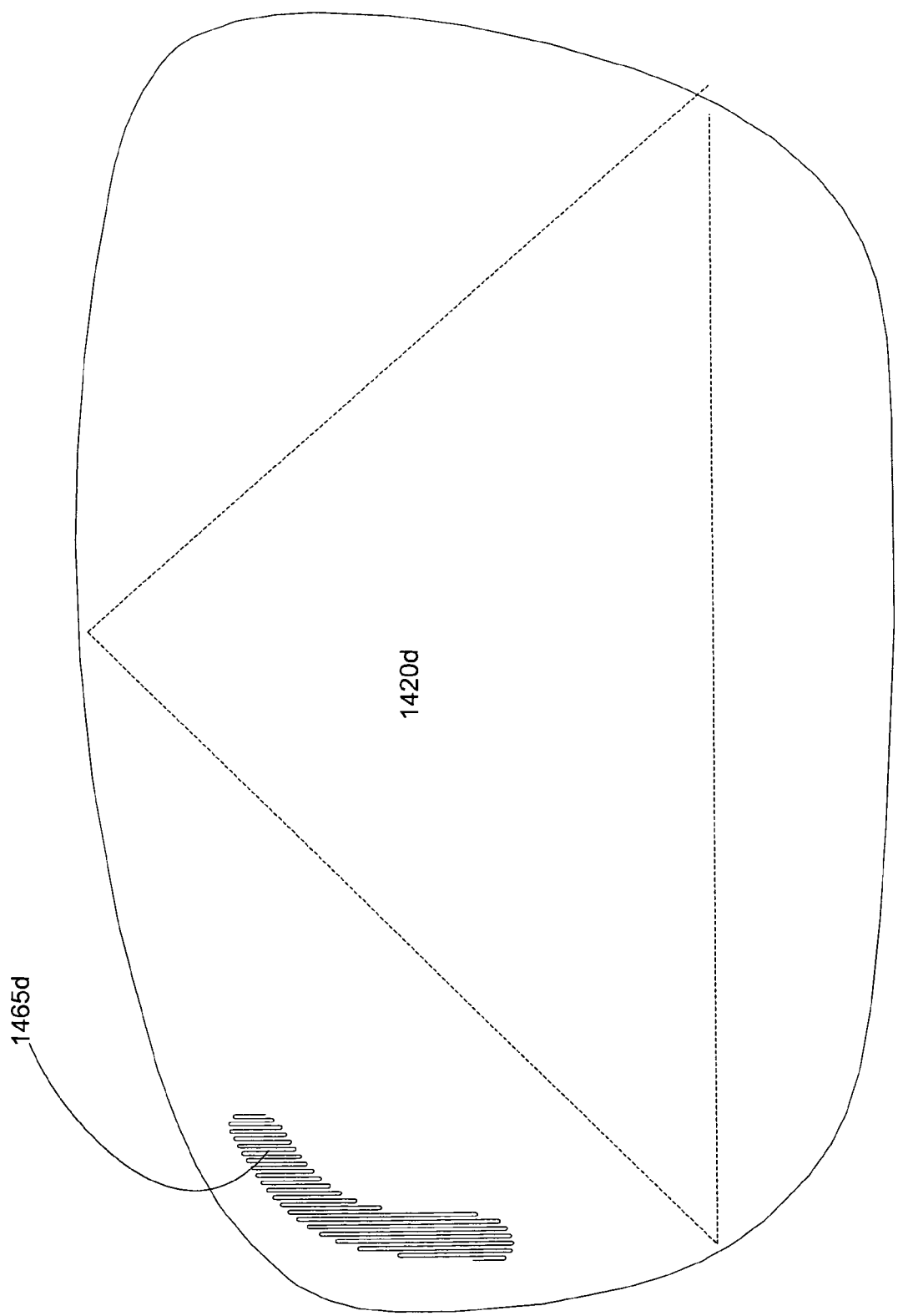
Figure 14E:
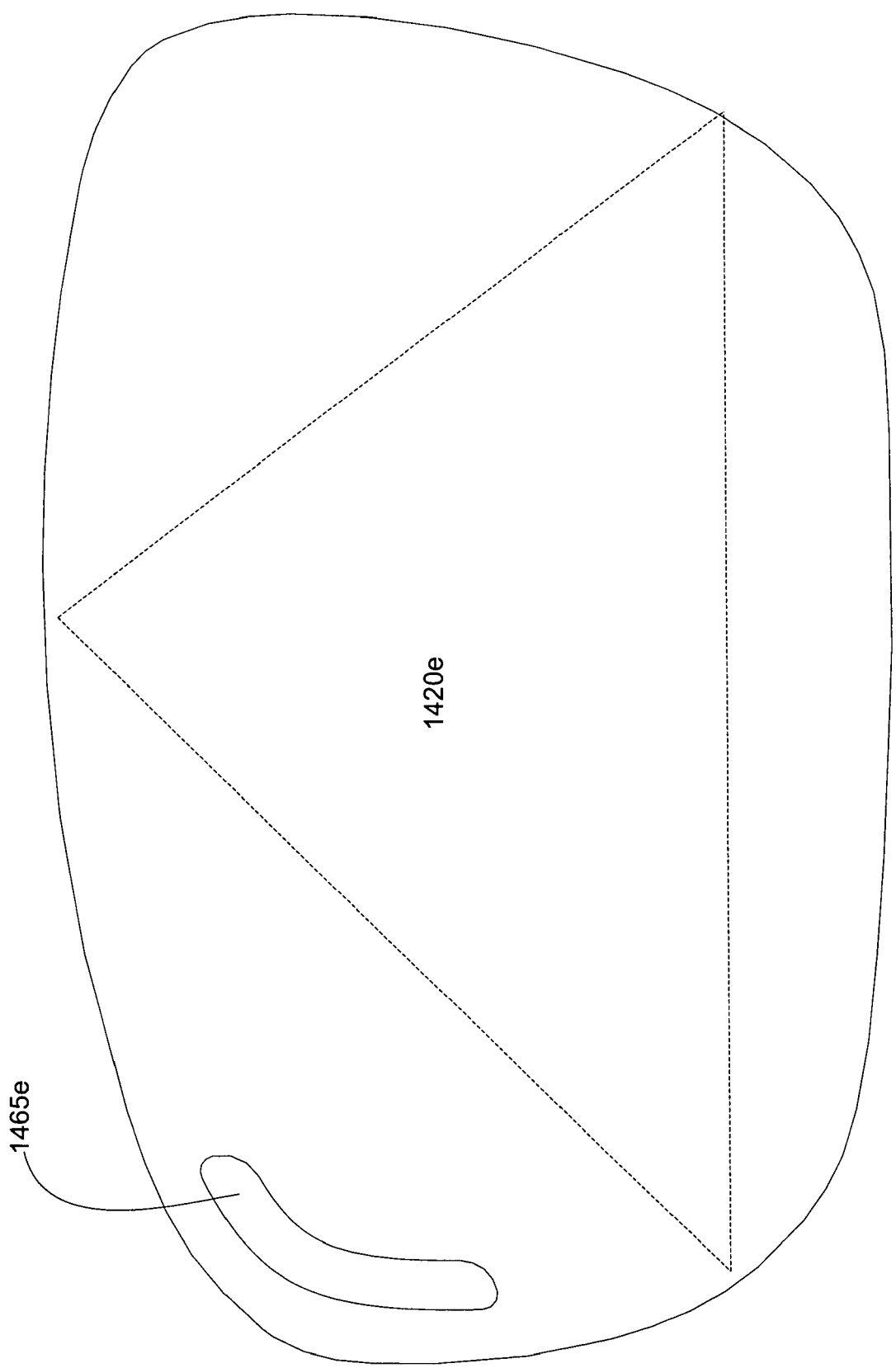

Turning now to FIGS. 14a-k, various embodiments of a rearview mirror assembly 1410a are depicted. In at least one embodiment, the assembly includes a mirror element 1421a, a carrier plate 1475a and a bezel 1424a. The mirror element comprises a first electrical contact 1425a1 and a second electrical contact 1425a2. A light source assembly is positioned within a compartment in the carrier plate behind the mirror element with respect to a viewer of the mirror assembly. In at least one embodiment, the light source assembly comprises first, second and third indicators 1441a1, 1442a1, 1443a1 mounted to a circuit board configured to function as a supplemental turning indicator; each of the indicators has an associated optic element 1441a2, 1442a2, 1443a2, respectively. In at least one embodiment, the assembly comprises fourth, fifth, sixth and seventh indicators 1444a1, 1445a1, 1446a1, 1447a1 mounted to the circuit board configured to function as an approach indicator to illuminate the area outside of a corresponding door of a controlled vehicle, such as, the ground, the door itself, a keyhole, a subcombination thereof or combination thereof. In at least one embodiment, the indicators are positioned within the rearview mirror assembly such that they are outside the field of view triangle as depicted by the dashed lines in FIGS. 14b-e. It should be understood that a single indicator, or more or less indicators, may be configured to provide the functions described or additional light sources may be included to provide additional indicators and, or, illuminators, such as, security lighting, blind spot indicators and the like. It should be understood that any of the illuminators and, or, indicators may be red, amber, white, blue-green, blue, green, yellow, orange or any other desired colored. In at least one embodiment, the indicators and, or, illuminators are light emitting diodes. Turning to FIG. 14b, a mirror element is depicted having a continuously extending etching 1465b in a corresponding reflective surface 1420b configured to increase the light transmission characteristics of an area in front of at least a portion of the light source assembly; as shown the etching follows a pattern similar to the overall shape of the light source assembly. Turning to FIG. 14c, a mirror element is depicted having a patterned etching 1465c in a corresponding reflective surface 1420c configured to increase the light transmission characteristics of an area in front of at least a portion of the light source assembly; as shown the etching define a pattern similar to the overall shape of the light source assembly. Turning to FIG. 14d, a mirror element is depicted having a continuously extending etching 1465d in a corresponding reflective surface 1420d configured to increase the light transmission characteristics of an area in front of at least a portion of the light source assembly; as shown the etching is predominately vertically extending to define a pattern similar to the overall shape of the light source assembly. It should be understood that the etching may extend predominately horizontal or at an angle in lieu of vertical. Turning to FIG. 14e, a mirror element is depicted having a continuous etching 1465e in a corresponding reflective surface 1420e configured to increase the light transmission characteristics of an area in front of at least a portion of the light source assembly; as shown the etching defines a pattern similar to the overall shape of the light source assembly. It should be understood that the areas may be masked portions when the reflective surface is applied to the substrate in lieu of subsequent etching.

Figure 14F:
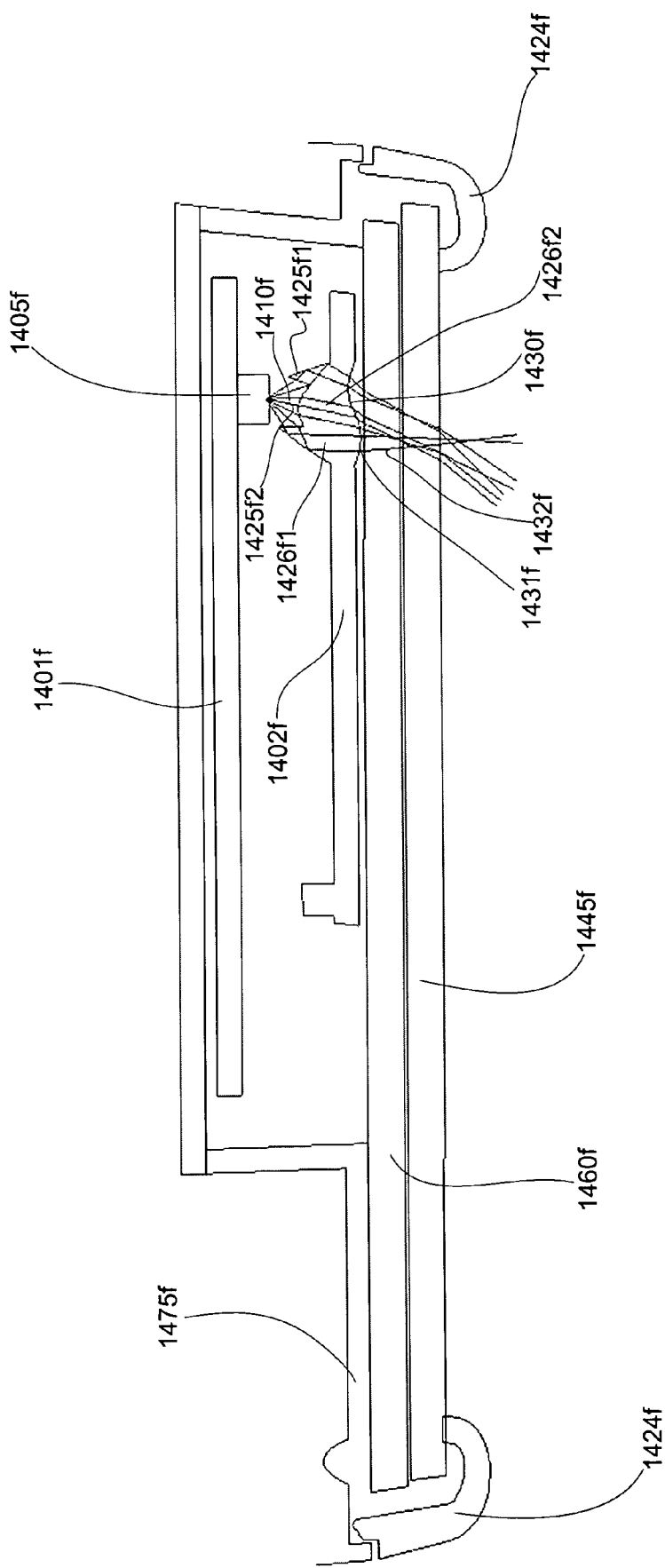

Turning now to FIG. 14f, a rearview mirror assembly is depicted comprising a mirror element having a first substrate 1445f and a second substrate 1460f positioned between a carrier plate 1475f and a bezel 1424f. In at least one embodiment, a light source assembly comprising at least one light source 1405f mounted to a circuit board 1401f and an optics element 1402f is positioned behind the mirror element with respect to a viewer. In at least one embodiment, the circuit board is angled with respect to the mirror element such that a primary optical axis of the associated light rays 1410f defines approximately a ten degree angle outboard with respect to the controlled vehicle. In at least one embodiment, a lens defined by a first surface having a total internal reflecting portion 1425f1 producing light rays 1426f1 and a collimating portion 1425f2 producing light rays 1426f2 combined with a second surface 1430f to produce light rays 1431f directed toward the mirror element to produce light rays 1432f transmitted through the mirror element.

Figure 14G:
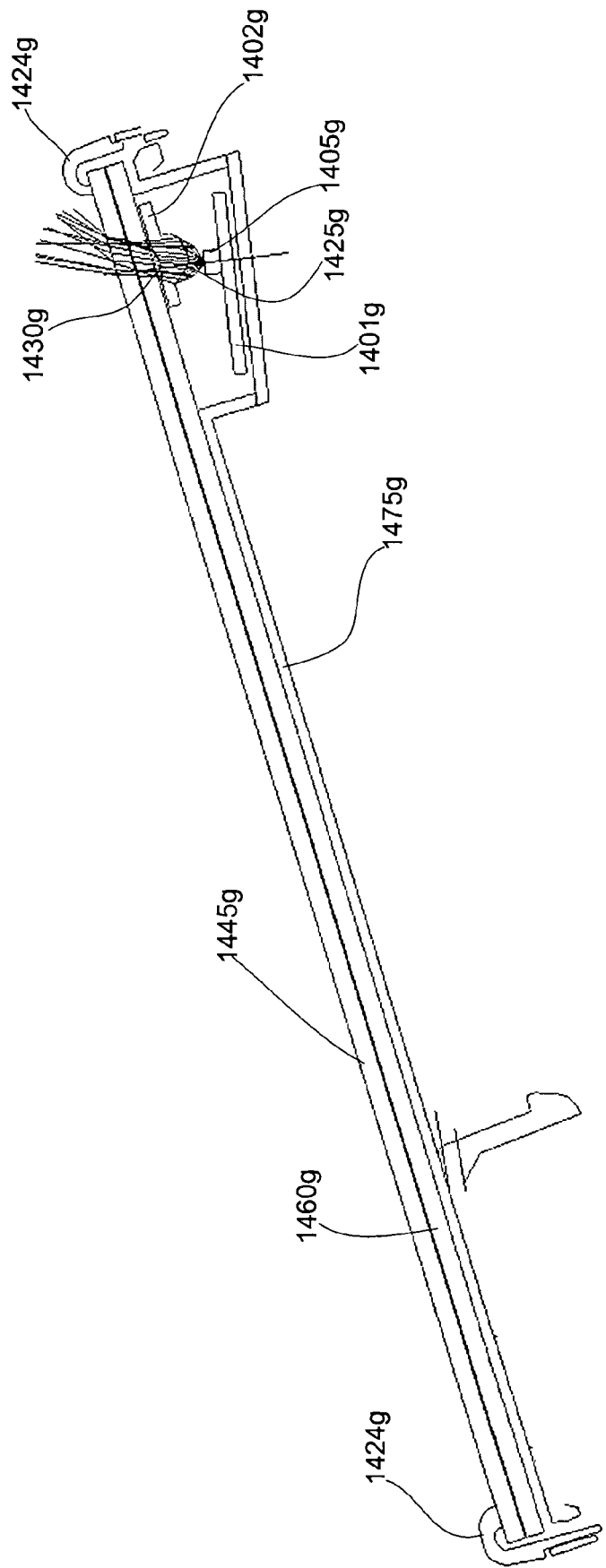

Turning now to FIG. 14g, a rearview mirror assembly is depicted comprising a mirror element having a first substrate 1445g and a second substrate 1460g positioned between a carrier plate 1475g and a bezel 1424g. In at least one embodiment, a light source assembly comprising at least one light source 1405g mounted to a circuit board 1401g and an optics element 1402g is positioned behind the mirror element with respect to a viewer. In at least one embodiment, the lens surface 1425g is slightly converging. In at least one embodiment, the slightly converging lens facilitates using a smaller etched or masked area in the reflective surface depicted in FIGS. 14b-e. In at least one embodiment, the lens comprises a macro beam shaping surface 1430g.

Figure 14H:
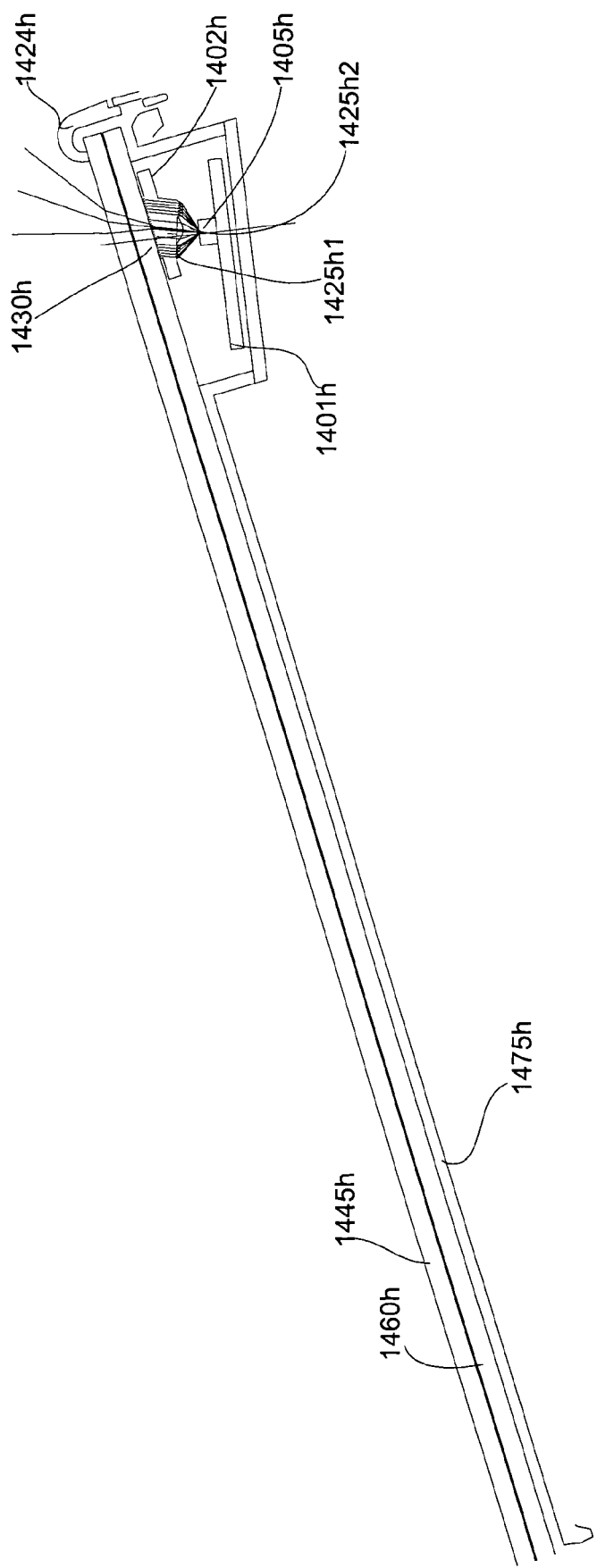

Turning now to FIG. 14h, a rearview mirror assembly is depicted comprising a mirror element having a first substrate 1445h and a second substrate 1460h positioned between a carrier plate 1475h and a bezel 1424h. In at least one embodiment, a light source assembly comprising at least one light source 1405h mounted to a circuit board 1401h and an optics element 1402h is positioned behind the mirror element with respect to a viewer. In at least one embodiment, the optics element comprises a lens having a Fresnel portion 1425h1 surrounding a collimating portion 1425h2 on a first surface and a refractive portion 1430h on a second portion. In at least one embodiment, this lens configuration results in a reduced depth associated with the light source assembly and carrier plate.

Figure 14I:
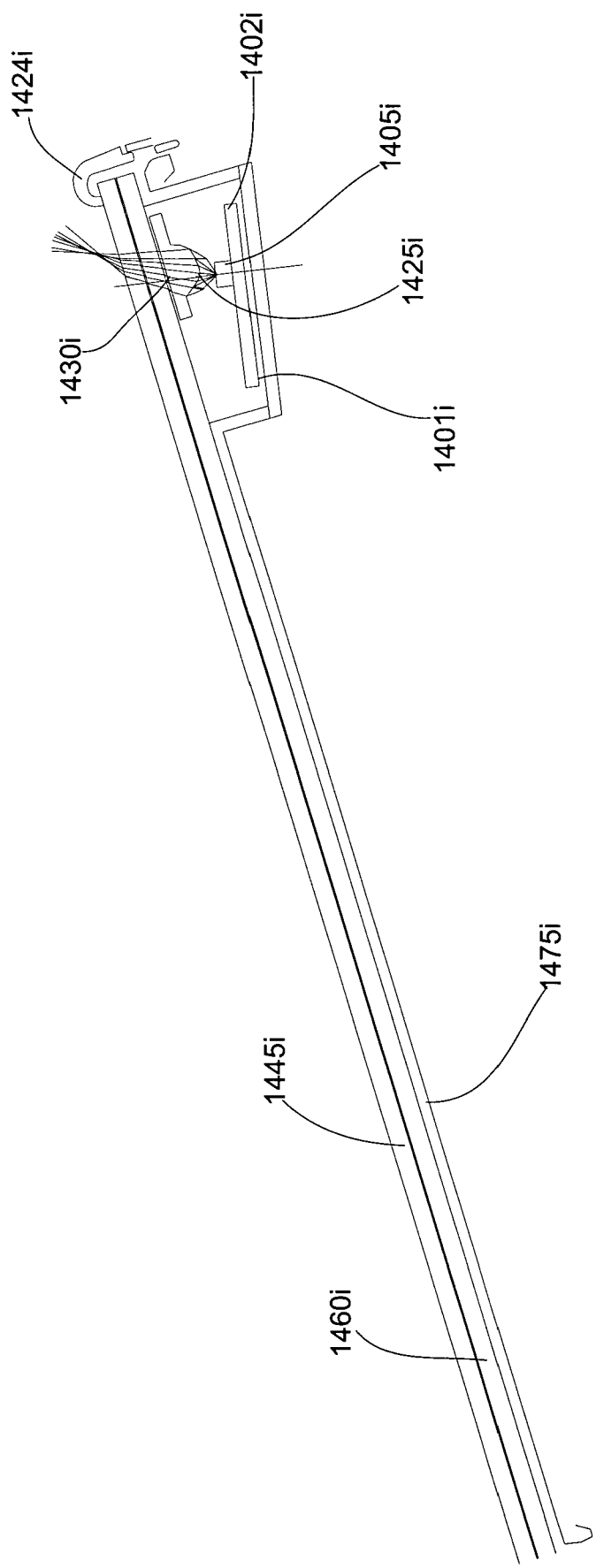

Turning now to FIG. 14i, a rearview mirror assembly is depicted comprising a mirror element having a first substrate 1445i and a second substrate 1460i positioned between a carrier plate 1475i and a bezel 1424i. In at least one embodiment, a light source assembly comprising at least one light source 1405i mounted to a circuit board 1401i and an optics element 1402i is positioned behind the mirror element with respect to a viewer. In at least one embodiment, the lens surface 1425i is slightly converging. In at least one embodiment, the slightly converging lens facilitates using a smaller etched or masked area in the reflective surface depicted in FIGS. 14b-e. In at least one embodiment, the lens comprises a planar macro beam shaping surface 1430i.

Figure 14J:
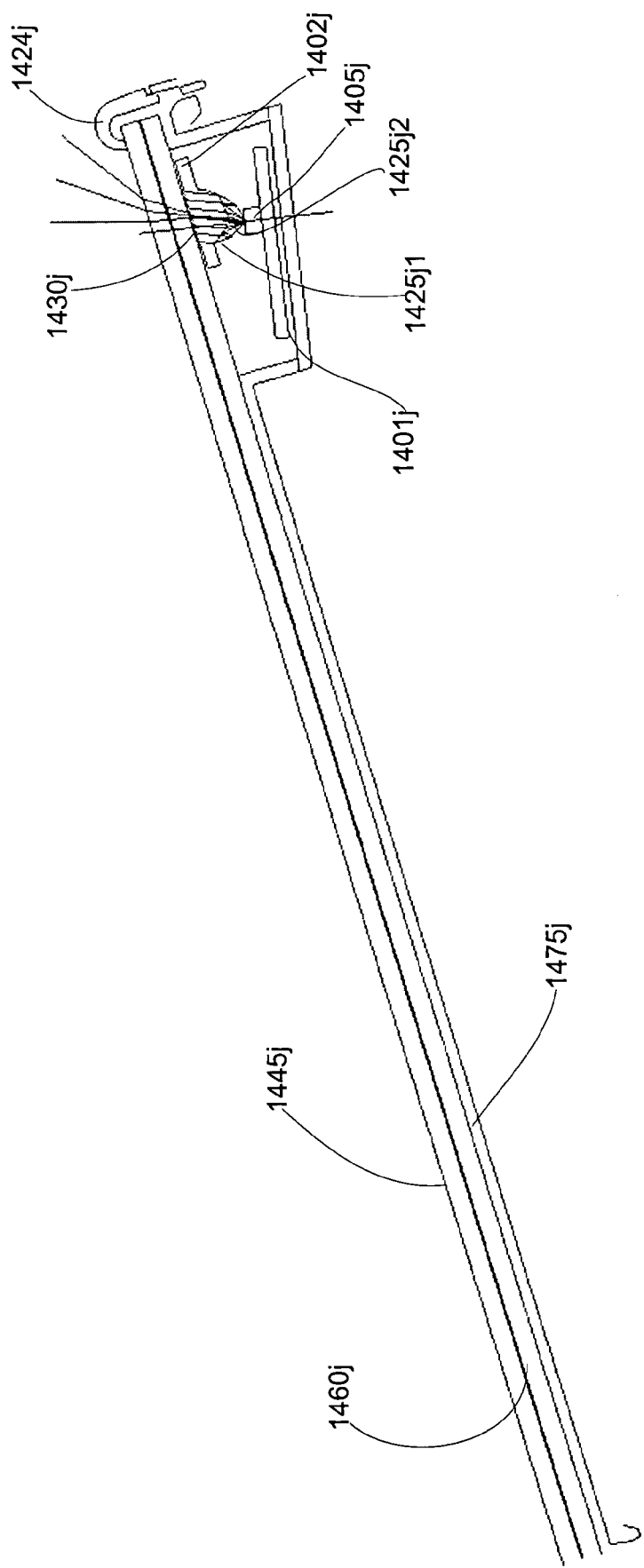

Turning now to FIG. 14j, a rearview mirror assembly is depicted comprising a mirror element having a first substrate 1445j and a second substrate 1460j positioned between a carrier plate 1475j and a bezel 1424j. In at least one embodiment, a light source assembly comprising at least one light source 1405j mounted to a circuit board 1401j and an optics element 1402*j* is positioned behind the mirror element with respect to a viewer. In at least one embodiment, the optics element comprises a first lens surface having a total internal reflecting portion 1425*j*1 surrounding a collimating portion 1425*j*2. In at least one embodiment, the lens comprises a refractive macro beam shaping surface 1430*j*. In at least one related embodiment, substantially complete collimating of the light rays emitted by an associated light source is achieved.

Figure 14K:
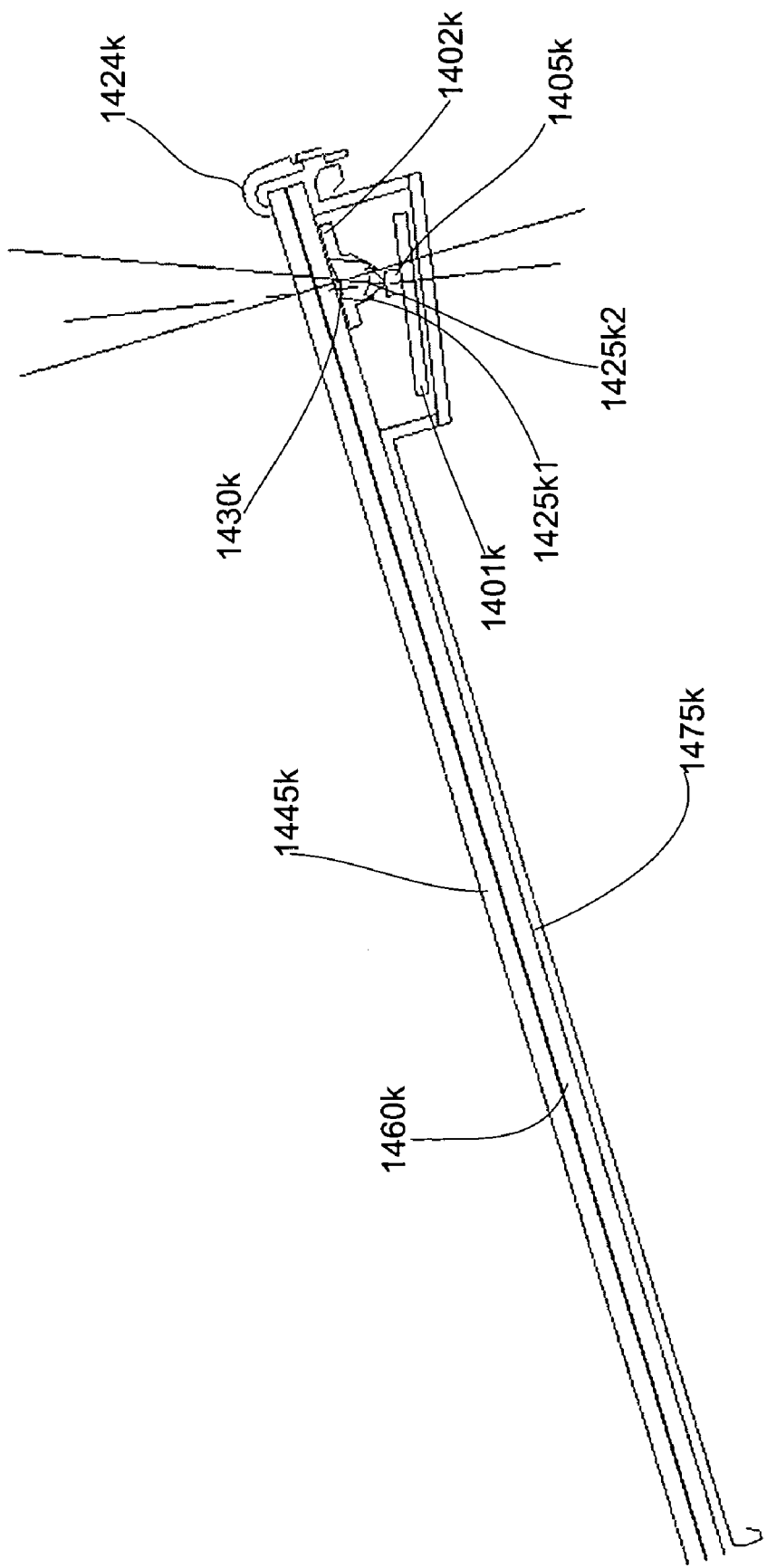

Turning now to FIG. 14*k*, a rearview mirror assembly is depicted comprising a mirror element having a first substrate 1445*k* and a second substrate 1460*k* positioned between a carrier plate 1475*k* and a bezel 1424*k*. In at least one embodiment, a light source assembly comprising at least one light source 1405*k* mounted to a circuit board 1401*k* and an optics element 1402*k* is positioned behind the mirror element with respect to a viewer. In at least one embodiment, the optics element comprises a first lens surface having a total internal reflecting portion 1425*k*1 surrounding a refractive portion 1425*k*2. In at least one embodiment, the lens comprises a macro beam shaping surface 1430*k*. In at least one related embodiment, the optics element is angled approximately ten degrees with respect to the circuit board and a combined approximate twenty degree angle results in the primary optical axis of the resulting light rays emitted from the first substrate to be approximately thirty-three degrees.

With reference now to FIGS. 15*a*-*e*, various embodiments of a rearview mirror assembly 15l0*a* comprising a supplemental turning indicator assembly 1540*a*, a side object detection indicator 1550*a* and a bezel 1524*a* are shown. Although an exterior rearview mirror assembly is depicted, it should be understood that the structure and function described herein is equally applicable to inside rearview mirror assemblies. It should be understood that the supplemental turning indicator and the side object detection indicator may take on a host of specific graphical representations; for example, the vehicle graphics and traffic lane lines may be removed leaving only the chevron and the triangle. It should be understood that the reflector and/or substantially transparent conductor layer remaining in the inside area of a triangle may remain electrically connected to the reflector and/or substantially transparent conductor layer outside the triangle via a portion of a reflector and/or substantially transparent conductor layer extending between the two. An arrow may replace the chevron as described elsewhere herein wherein the shaft of the arrow provides additional indicator and or illuminator functions. In at least one embodiment a smaller chevron may be "embedded" next to the larger chevron toward the controlled vehicle and function as a side object detection indicator. In at least one embodiment a series of chevrons may be placed proximate one another and have associated light sources that are configured to provide a sequential lighting of the individual chevrons; the individual chevrons may comprise unique colors to indicate the presence of an object in the area generally to the side and rear of a driver of a controlled vehicle. In at least one embodiment a supplemental turning indicator and a side object detection indictor define a single contiguous opening in a reflective layer and/or substantially transparent electrode. In at least one embodiment, a graphic of a vehicle is provided that illuminates when an object is detected beside the controlled vehicle; in lieu of a side object detection indicator shown in FIG. 15*a* a graphic of a vehicle may be accompanied by a series of graphical lines that light in various colors depending upon the proximity of the object to the controlled vehicle. The term "indicia" is used herein to mean a symbol that holds a symbolic meaning in and of itself wherein the shape is an abstraction for another meaning, such as, a chevron or arrow to indicate a vehicle is about to move in a certain direction or another object is close by, a triangle to indicate a warning, or the like; the indicia are not to be confused with a square, rectangular, circular or oval shape that individually have no symbolic meaning. It should be understood that a flash rate of a supplemental turning indicator and or a side object detection indicator may be independently varied to indicate to a driver of a controlled vehicle different operating environments and impending mishaps, for example, the supplemental turning indicator may flash faster when an object is detected or may flash at a rate different from a flashing side object detection indicator depending upon the proximity of a detected object.

It should be understood that any of the blind spot indicators and or side object detection indicators described herein may be activated by use of a variety of sensors, such as, sonar transmitter/receiver, radar transmitter/receiver, magnetic sensor, electromagnetic sensor, capacitive sensor, image sensors, motion sensors, light sensors, etc. In at least one embodiment a control is provided to receive signals from at least one sensor and to automatically activate the appropriate indicator. Sensors may be provided in an exterior mirror assembly, on a side exterior of an associated vehicle, such as, in a side exterior light assembly, on a rear portion of a vehicle, such as, the bumper, CHMSL, a taillight assembly, a license plate light assembly or a headlight assembly. In at least one embodiment, a side object detection indicator will not be automatically energized unless a turn signal is activated by a driver of the controlled vehicle.

Figure 15A:
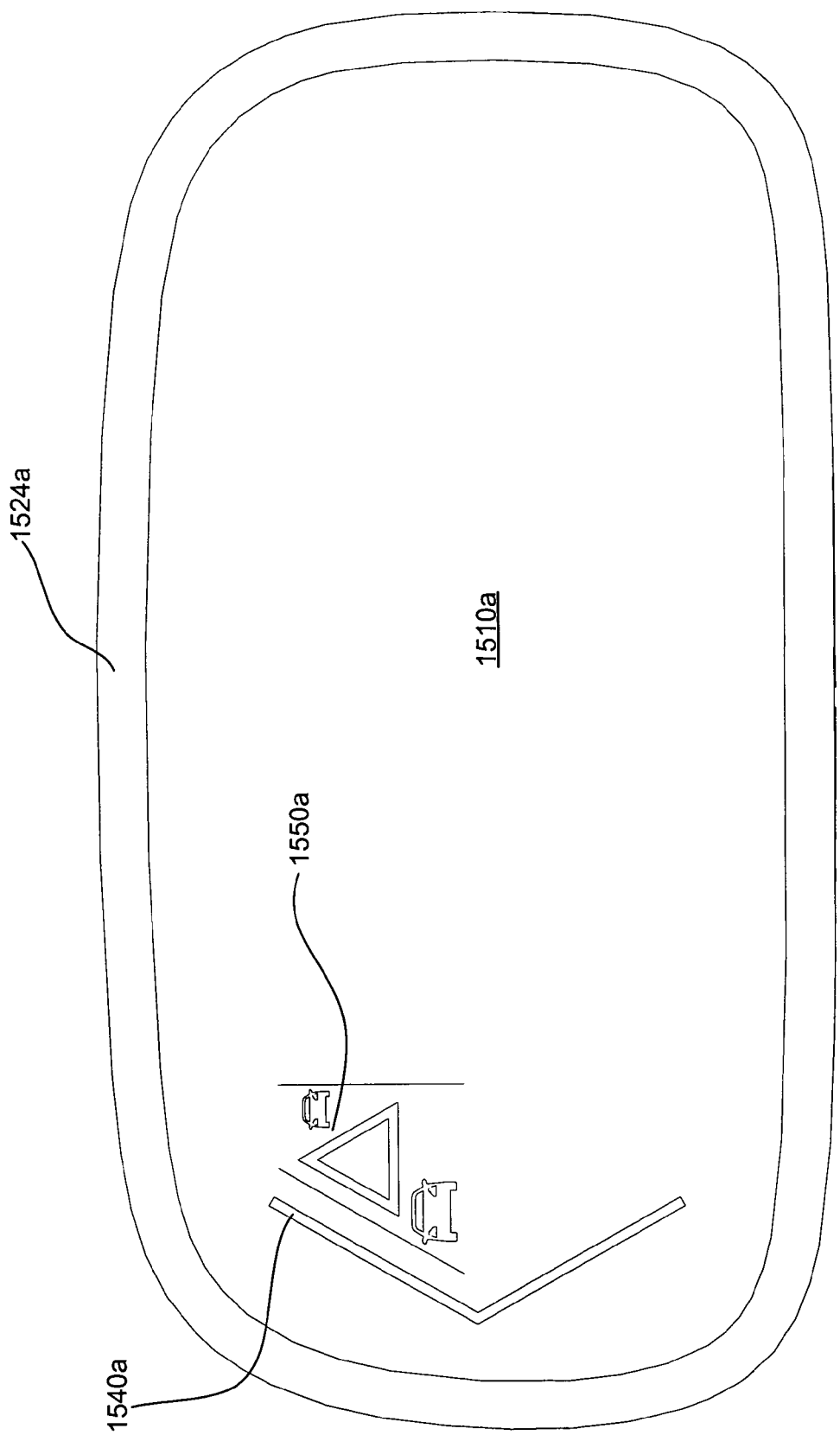
FIGS. 15a-e depict various embodiments of a rearview mirror comprising a supplemental turning indicator and a side object detection indicator.
Figure 15B:
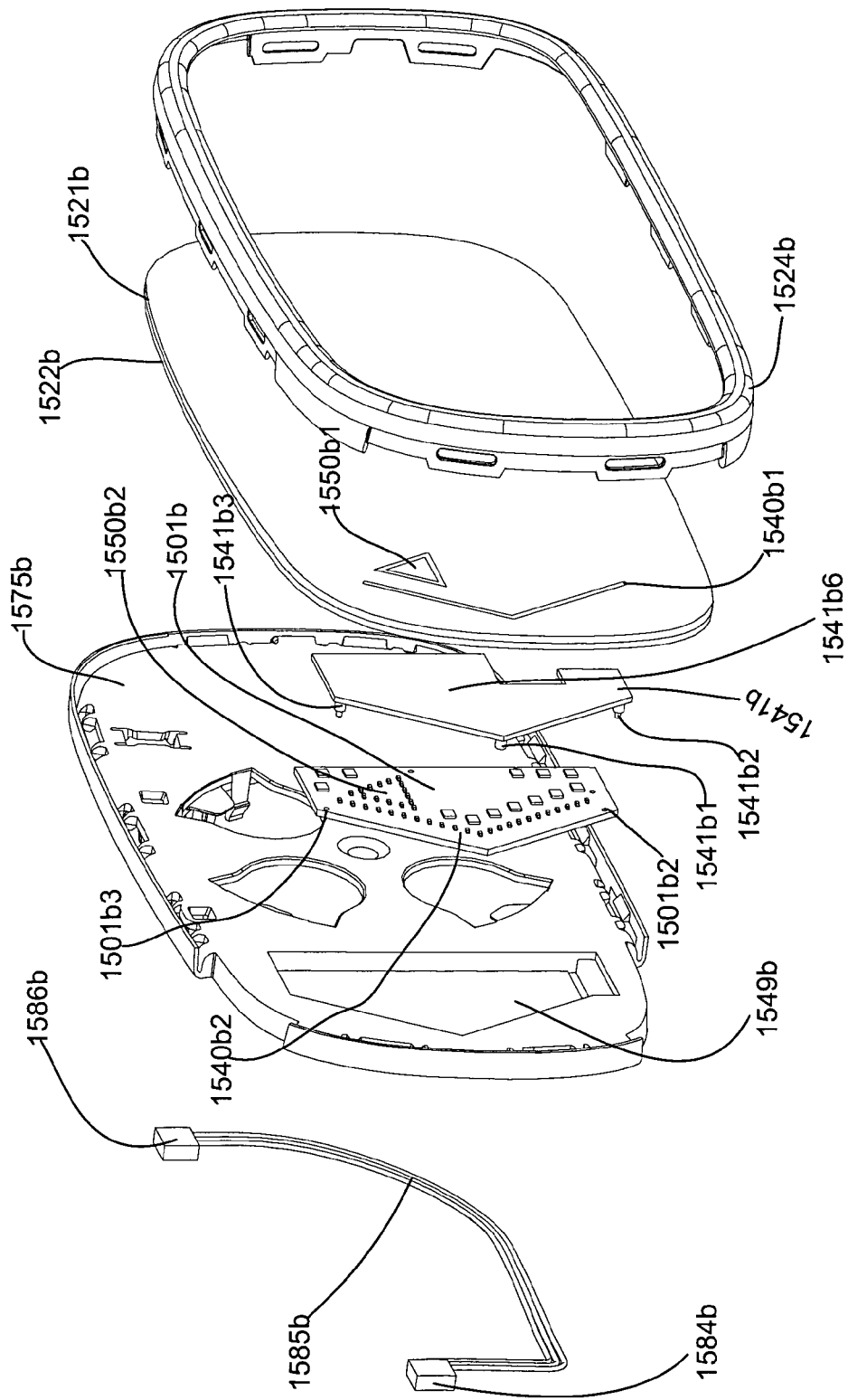

FIG. 15*b* depicts an exploded view of a rearview mirror assembly from a frontal perspective. In at least one embodiment, a mirror assembly comprises a supplemental turning indicator 1540*b*1, 1540*b*2 and a side object detection indicator 1550*b*1, 1550*b*2. In at least one embodiment, the supplemental turning indicator and side object detection indicator are incorporated into a common module comprising indicia etched (or masked) in a corresponding mirror element reflector and or electrode, a combination optics block 1541*b* and a printed circuit board 1501*b*. In at least one embodiment the combination optics block comprises a plurality of individual optics elements as depicted and described with reference to FIGS. 15*c*-*e*, alignment pins/standoffs 1541*b*2, 1541*b*3, standoff 1541*b*1 and optical surface 1541*b*6. In at least one embodiment the optical surface 1541*b*6 is a light ray diffusing surface, a light ray diffracting surface, a light ray deviating surface, a subcombination thereof or a combination thereof. In at least one embodiment a plurality of light sources 1540*b*2 are configured on the printed circuit board to define the supplemental turning indicator and a plurality of light sources 1550*b*2 are configured on the printed circuit board to define the side approach indicator. In at least one embodiment the printed circuit board comprises a series of alignment holes 1501*b*2, 1501*b*3 configured to engage the alignment pins/standoffs of the combination optics block to provide accurate alignment of the individual optics elements with the desired light source(s). In at least one embodiment the light sources are SmartLEDs selected from the 0603 series available from OSRAM Opto Semiconductors GmbH, Wernerwerkstrasse 2, D-93049 Regensburg, Germany. Additional details of the supplemental turning indicator and side object detection indicator are described elsewhere herein. In at least one embodiment the supplemental turning indicator/side object detection indicator assembly is positioned within a receptacle 1549*b* within a carrier 1575*b* behind a rear substrate 1522*b* of a corresponding mirror element. In at least one embodiment, the mirror element comprises a front substrate 1521*b* and is retained within the carrier via a bezel 1524*b*. It should be understood that a rearview mirror assembly with no bezel may be configured in lieu of an assembly having a bezel; an element having a substantially opaque reflective ring about a perimeter portion as described in commonly assigned patents and patent applications incorporated herein may be employed. It should be understood that the mirror element may be either a single substrate having a reflector on a rear most surface or may be an electro-optic mirror element having a reflector on either a front or rear surface of a rear substrate. It should be understood that either substrate or each substrate may be from approximately 1.0 mm to approximately 2.5 mm thick, preferably 2.2 mm, more preferably 1.6 mm and most preferably 1.1 mm; one substrate may be thicker than the other. In any event, a supplemental turning indicator and or side object detection indicator may be formed in the corresponding reflective layer and or substantially transparent electrode by removal of at least a portion, or all, of the reflective layer in a desired pattern or by masking the substrate during application of the reflective layer and or substantially transparent electrode to the substrate. It should also be understood that a transflective layer or layers may be utilized in lieu of etching or masking the reflective layer or layers, in this case location of the individual light sources defines the desired indicator shape. An electrical wire harness 1585$b$ is provided with plugs 1584$b$, 1586$b$ to supply electrical power from a corresponding controlled vehicle to the mirror assembly including a supplemental turning indicator, a side object detection indicator, a heater, an electro-optic element, a subcombination thereof, a combination thereof and additional electrical apparatus as described elsewhere herein, such as, a light sensor, an image sensor, a sonar sensor, a radar sensor, magnetic sensor, electro-magnetic sensor, capacitive sensor, a motion sensor, a blind spot indicator, a security light, a keyhole/door illuminator, an illuminator and an information display.

Turning now to FIG. 15$c$, an exploded view of a rearview mirror assembly is depicted from a rearward perspective. In at least one embodiment a supplemental turning indicator 1540$c$1, 1540$c$3 and a side object detection indicator 1550$c$1, 1550$c$3 are provided. In at least one embodiment a heater 1571$c$ is provided with an aperture 1571$c$1 formed therein such that light rays from light sources associated with the supplemental turning indicator and or side object detection indicator will pass therethrough. In at least one embodiment a light diffusing film is provided within said aperture and may be formed integral with the heater. It should be understood that a light diffuser may be provided on a surface of the mirror element by either etching, such as by sand blasting or the like, the glass or by laser etching a coating on the glass such that a residual coating is left on the glass and or such that the glass itself becomes a light ray diffusant. In at least one embodiment a supplemental turning indicator and a side object detection indicator are incorporated into a common assembly comprising a printed circuit board 1501$c$ having alignment holes 1501$c$2, 1501$c$3, 1501$c$4, 1501$c$5 and a common optics block 1541$c$ having alignment pins/standoffs 1541$c$2, 1541$c$3, 1541$c$4, 1541$c$5, a standoff 1541$c$1, a plurality of optics elements 1540$c$3 configured for the supplemental turning indicator and a plurality of optics elements 1550$c$3 configured for the side object detection indicator. In at least one embodiment a supplemental turning indicator/side object detection indicator assembly is positioned within a receptacle 1549$c$ within a carrier 1575$c$ behind a rear substrate 1522$c$ of a mirror element. In at least one embodiment a mirror element is provided with a front substrate 1521$c$ and a rear substrate forming an electro-optic element. In at least one embodiment a mirror element is retained within a carrier via a bezel 1524$c$.

An electrical wire harness 1585$c$ is provided with plugs 1584$c$, 1586$c$ to supply electrical power from a corresponding vehicle to the mirror assembly including a supplemental turning indicator, a side object detection indicator, a heater, an electro-optic element, a subcombination thereof, a combination thereof and additional electrical apparatus as described elsewhere herein, such as, a light sensor, an image sensor, a sonar sensor, a radar sensor, magnetic sensor, electro-magnetic sensor, capacitive sensor, a motion sensor, a blind spot indicator, a security light, a keyhole/door illuminator, an approach light, an illuminator and an information display.

Turning to FIG. 15$d$ a sectional view of a rearview mirror assembly is depicted comprising a supplemental turning indicator and a side object detection indicator. In at least one embodiment an electro-optic mirror element comprising a rear substrate 1522$d$, a front substrate 1521$d$ fixed in a spaced apart relationship with one another via a seal 1523$d$ are provided. In at least one embodiment a reflector is provided on an inward facing surface of a rear substrate having indicia 1540$d$1, 1550$d$1 formed therein. In at least one embodiment a heater 1571$d$ is provided having an aperture 1571$d$1 formed therein and configured such that light rays emitted from a supplemental turning indicator and side object detection indicator are transmitted therethrough. In at least one embodiment a supplemental turning indicator and side object detection indicator are positioned behind a mirror element within a receptacle of a carrier 1575$d$ along with a heat extraction member 1531$d$. In at least one embodiment a bezel 1524$d$ is provided to retain a mirror element within a carrier. In at least one embodiment a supplemental turning indicator and side object detection indicator assembly is provided comprising a printed circuit board 1501$d$ and a common optics block 1541$d$. In at least one embodiment a printed circuit board is provided with a plurality of light sources 1550$d$2 configured to define a side object detection indicator and a plurality of light sources 1540$d$2 configured to define a supplemental turning indicator. In at least one embodiment a common optics block is provided with a plurality of optics elements 1550$d$3 configured to define a side object detection indicator and a plurality of optics elements 1540$d$1 configured to define a supplemental turning indicator. In at least one embodiment, each optics element comprises a light ray lens portion 1540$d$3$a$/1550$d$3 and a light ray collecting portion 1540$d$3$b$/1550$d$3$b$ configured to redirect light rays emitted by associated light sources such that light rays emitted from a corresponding assembly are directed to a desired field of view as described elsewhere herein; it should be understood that it is generally desirable to have a supplemental turning indicator configured such that substantially all light rays are visible by a driver of a vehicle that may be in a rear/side area with relationship to the controlled vehicle and substantially all light rays emitted from a side object detection indicator are visible by a driver of a controlled vehicle. It should be understood that a portion of light rays emitted by a supplemental turning indicator may be directed to a driver of a controlled vehicle to provide feedback to the driver.

Turning now to FIG. 15$e$ a light source 1540$e$2/1550$e$2 mounted to a printed circuit board 1501$e$ is depicted in proximity of a common optics block 1541$e$ having an optics element 1540$e$3/1550$e$3 and an optical surface 1541$e$6. In at least one embodiment an optics element comprises a light ray lens portion 1540$e$3$a$/1550$e$3$a$ and a light ray collecting portion 1540$e$3$b$/1550$e$3$b$. It should be understood that an optics element may be provided with a total internal reflection (TIR) portion, a diverging portion, a collimating portion, a deviating portion, a diffusing portion, a Fresnel lens portion, a collecting portion, a subcombination thereof or a combination thereof. It should be understood that a light source may comprise a primary optics element (not shown) that may, in and of itself, comprise a total internal reflection (TIR) portion, a diverging portion, a collimating portion, a deviating portion, a diffusing portion, a Fresnel lens portion, a collecting portion, a subcombination thereof or a combination thereof; this primary optics element may be in addition to, or in lieu of, a secondary optics element. It should be understood that an optical surface 1541e6 as described elsewhere herein may also be included to control the overall light ray direction.

In at least one embodiment a plurality of light sources are configured to project light rays through a given optics element, such as having a red, green and blue light source configured such that any desired color may be achieved by provided an appropriately configured control circuit. In at least one embodiment at least one amber light source and at least one blue/green light source is provided such that either amber, blue/green or white light may be achieved with use of an appropriately configured control circuit. It should be understood that any other color light source(s) may be employed.

In at least one embodiment the total height of a supplemental turning indicator and or side object detection indicator is less than 15 mm, preferably less than 12.5 mm, more preferably less than 10 mm and most preferably less than 5.5 mm thick measured from the bottom of a circuit board to an optical surface of a corresponding common optics block. In at least one embodiment each light source is approximately 1.7 mm long, approximately 0.8 mm wide and approximately 0.65 mm high. In at least one embodiment an opening associated with an indicia, or a portion thereof, is approximately 1.5 mm wide and a plurality of light sources approximately 1.7 mm wide are positioned behind the indicia opening. With this configuration substantially all of the light rays emitted by the light sources pass through the corresponding opening.

In at least one embodiment individual lights sources are LED chips or dice measuring from approximately 0.008 in. to approximately 0.12 in. long by approximately 0.01 in. to approximately 0.016 in. wide by approximately 0.005 in. to approximately 0.013 in. high. Light source assembly with LEDs may be discrete surface mount technology mount to a printed circuit board with silver, indium or other non-lead based solder or by conductive epoxies. The individual LEDs may be standard mount or reverse mount using a reflector or the like to redirect light rays where desired. FR4 or high temperature FR4, metal clad, passivated aluminum, anodized aluminum, thin film aluminum, etc. or flex circuit boards may be employed.

LEDs may be discrete LED components and or LED chips. In at least one embodiment individual LED chips define a chip on board array with one of the aforementioned types of printed circuit boards. Metal cladding two sided or multi-layer; individual layers may be approximately 1.0 once to approximately 8.0 once copper, preferably approximately 3 once. The printed circuit board thickness may be approximately 0.15 in. to approximately 0.25 in., preferably 0.2 in. to approximately 0.7 in and most preferably 0.31 in. Preferably, the printed circuit board is plated through thermal vias around and or near the LEDs. It should be understood that either surface mount LEDs or LED chips may be mounted directly to at least one surface of a rearview mirror associated glass substrate, preferably a rear surface of a rear substrate.

Figure 15C:
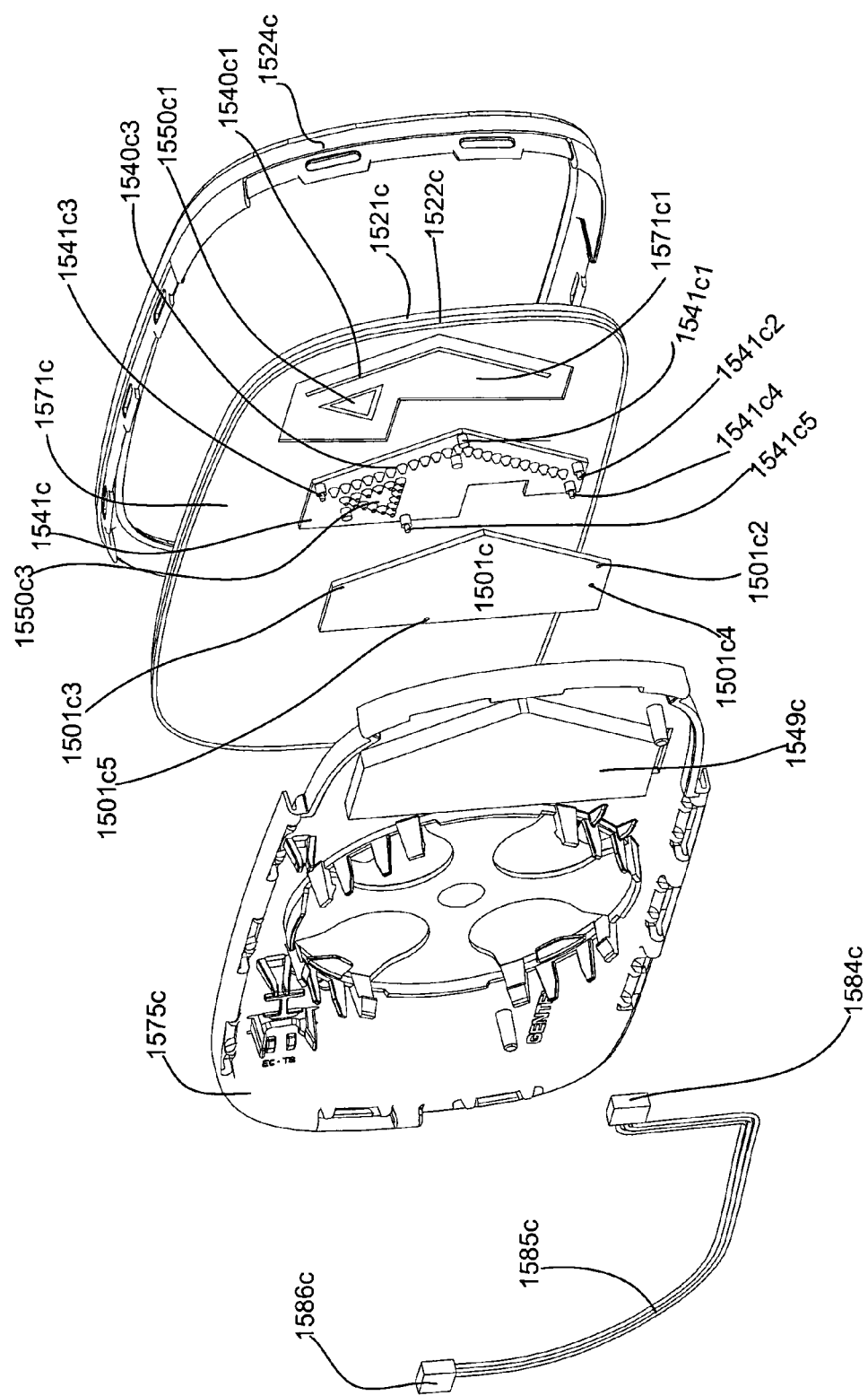
Figure 15D:
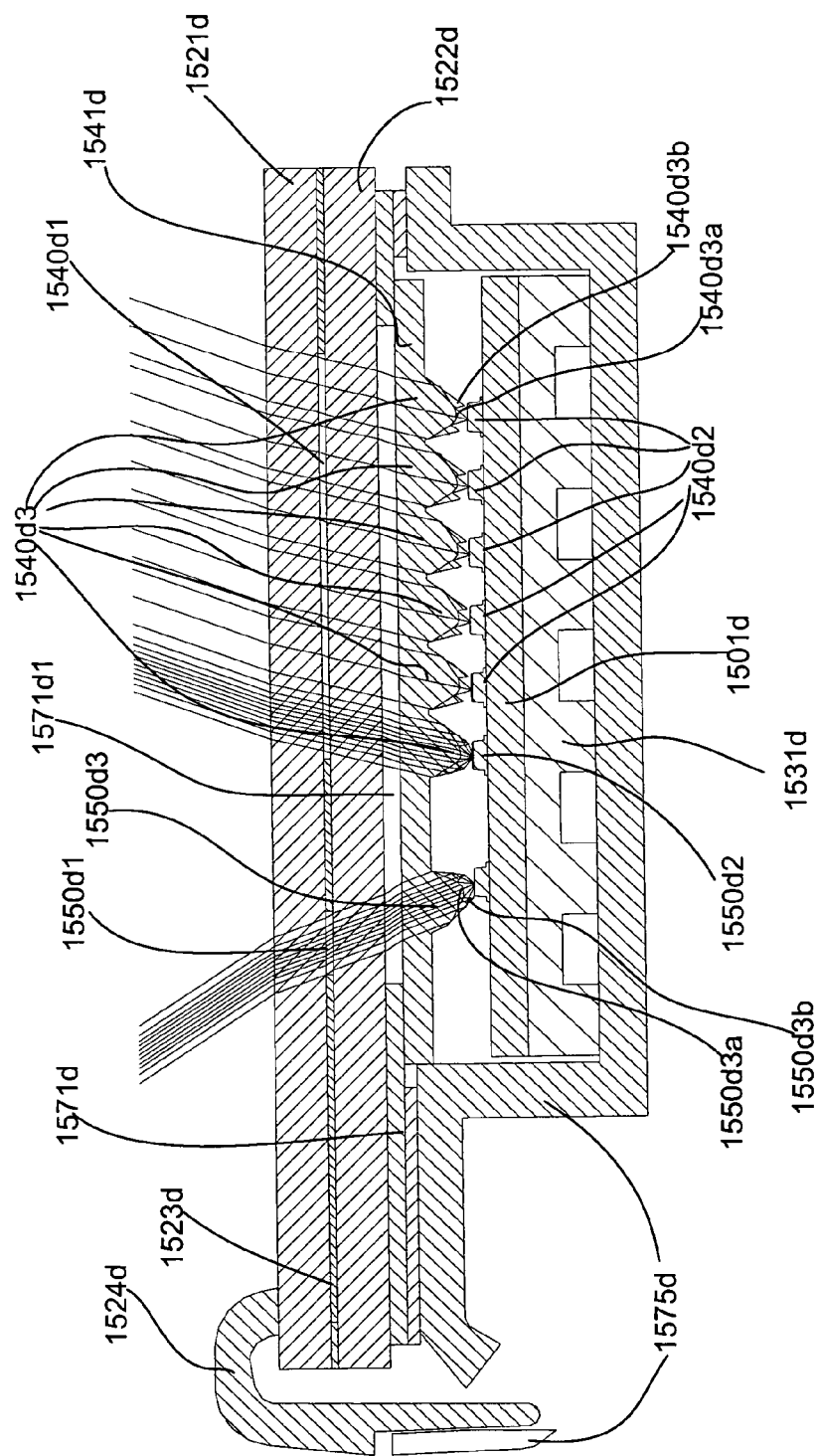
Figure 15E:
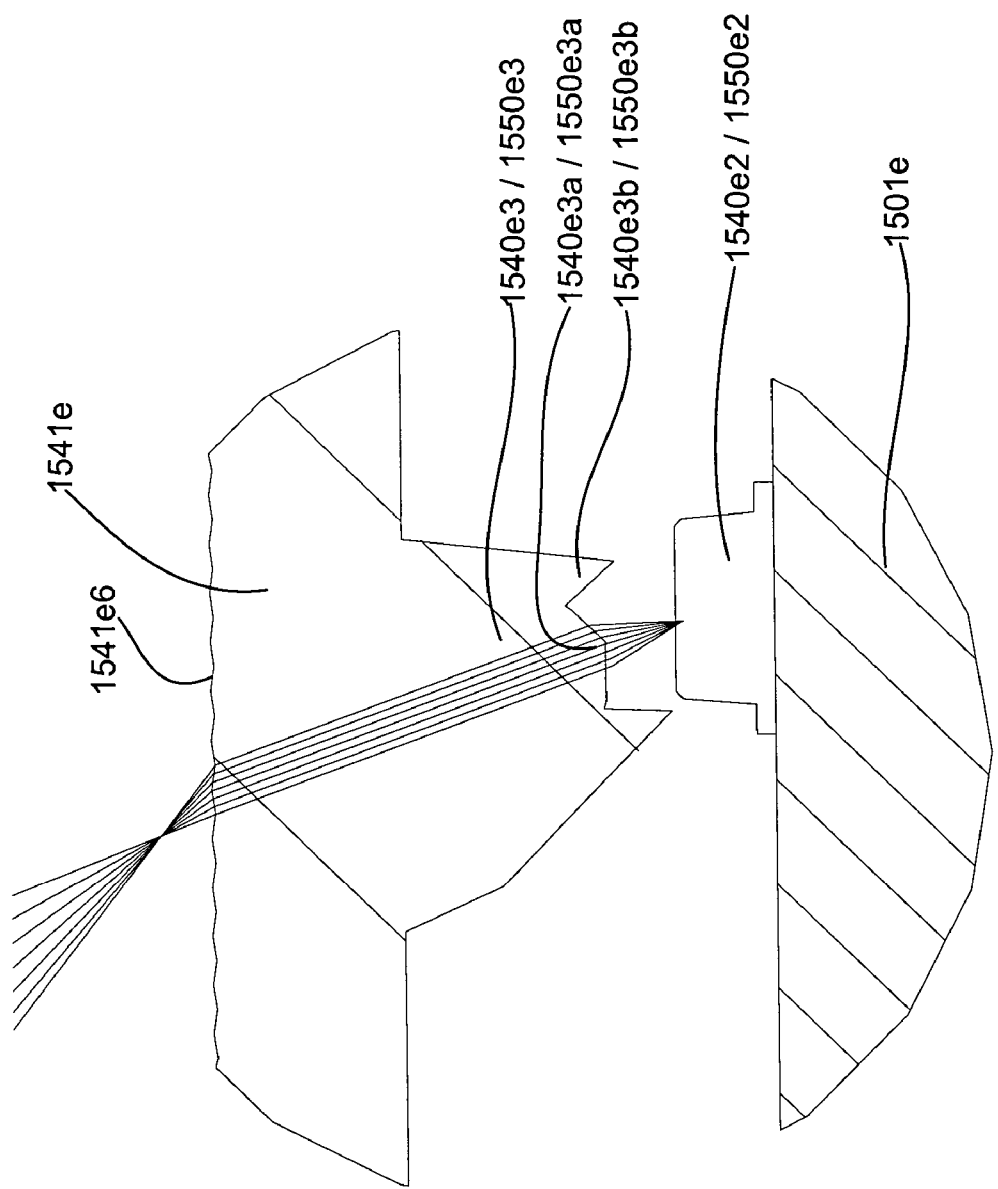

In at least one embodiment as depicted in FIG. 15a substantially rectangular shape mirror assembly having rounded corners is approximately 210 mm wide and approximately 105 mm high and comprises a chevron shaped supplemental turning indicator is provided with a width of approximately 1.5 mm and each leg being approximately 35 mm. Twenty-three light sources are positioned as depicted in FIG. 15b such that light rays are projected through a common optics block as depicted in FIG. 15c having twenty-three individual optics elements associated with the chevron shape. In at least one embodiment a luminous flux of each light source is either approximately 250 mlm, approximately 275 mlm, approximately 320 mlm, approximately 400 mlm, approximately 445 mlm, approximately 500 mlm, approximately 530 mlm or approximately 640 mlm. It should be understood that depending what type light source is selected that between approximately 0.2 and approximately 0.5 times the amount of light emitted from the device will actually pass through a corresponding indicia opening, therefore, the average luminous flux density numbers may be lower than what would otherwise be the case if all the light rays emitted were to go through the opening. The losses may be due to a variety of optical loss, such as, light rays that do not impinge upon an associated optical element as desired, optical element imperfections, reflective light ray loss, etc. With twenty-three light sources positioned behind a chevron having a total opening of approximately 105 $mm^2$ a corresponding average luminous flux density is between approximately 54.76 $mlm/mm^2$ and approximately 140.1 $mlm/mm^2$ depending upon the specific light sources selected. In at least one embodiment as depicted in FIG. 15a a triangle is provided having each side with a length approximately 14.5 mm and a width approximately 1.5 mm for a total open area of approximately 65.25 $mm^2$; with a total of fifteen light sources the luminous flux density is between approximately 57.47 $mlm/mm^2$ and approximately 147.12 $mlm/mm^2$. In at least one embodiment an opening in a reflective layer and or substantially transparent electrode associated with an indicia is approximately 0.8 mm and at least one light source is oriented such that its width of 0.8 mm is aligned with the opening. In at least one embodiment an opening associated with an indicia is less than approximately 2 mm wide, preferably less than approximately 1.7 mm wide, more preferably less than approximately 1 mm wide and most preferably less than approximately 0.8 mm wide and at least one light source is positioned behind the opening such that a corresponding width and or length is oriented with respect to the opening such that the width of the opening is greater than or equal to the width or length of the at least one light source. The narrow opening associated with the individual indicia provide scalability with regard to the overall mirror assembly; for example, the length of the legs of a given chevron may be a function of the overall height and or width of the given mirror assembly. The total number of light sources as open indicia area may then be increased or decreased to provide the average luminous flux density desired. An additional benefit of a narrow indicia opening is with regard to the coloring and or clearing of an associated electro-optic element, uniform coloring and or clearing is a function of the opening width when a reflector (that functions at least in part as an electrode) is on an inner surface of a rear substrate. Therefore, it is desirable to maintain uniform coloring and or clearing by providing sufficiently narrow openings. A benefit of using correspondingly narrow light sources is that little if any light loss results, therefore, heat generation is kept to a minimum. Heat generation in mirror assemblies is not desirable. A printed circuit board having heavy metallic coatings may be employed to function as a heat extraction element for removing heat from the light sources; in at least one embodiment a heavy metallic coating is in thermal communication with a heat extraction member such as described with regard to FIG. 15d. It should be understood that thermally conductive polymers, either electrically insulating or not, may be employed in lieu of or in addition to metallic structure to remove heat from the light source(s).

Although the present invention has been described with regard to specific embodiments, it should be understood that the scope of the present invention extends to all embodiments encompassed within the doctrine of equivalents.

What is claimed is:

1. An apparatus, comprising:
   a mirror element comprising at least one substrate comprising a reflective layer on at least a portion of a surface thereof; and
   two differently functioning indicia formed in said reflective layer, functions of said two indicia being selected from the group consisting of a supplemental turning indicator, keyhole/door illuminator, and a side object detection indicator, wherein both of said at least two indicia are defined by one contiguous line opening through said reflective layer.

2. An apparatus as in claim 1 wherein said two indicia have a symbolic meaning abstractly associated with a shape.

3. An apparatus as in claim 1 configured such that when mounted on a left side of a controlled vehicle said supplemental turning indicator indicates that the controlled vehicle is about to move or is moving to the left when an associated light source is energized.

4. An apparatus as in claim 1 configured such that when mounted on a right side of a controlled vehicle said supplemental turning indicator indicates that the controlled vehicle is about to move or is moving to the right when an associated light source is energized.

5. An apparatus as in claim 1 wherein said one contiguous line is less than approximately 2.0 mm wide.

6. An apparatus as in claim 1 wherein said one contiguous line is between approximately 0.8 mm and 2.0 mm wide.

7. An apparatus as in claim 1 wherein an average luminous flux density of said supplemental turning indicator is between approximately 14.0 mlm/mm$^2$ and approximately 147.0 mlm/mm$^2$.

8. An apparatus, comprising:
   a mirror element comprising at least one substrate comprising a reflective layer on at least a portion of a surface thereof;
   at least one indicia formed in said reflective layer, said at least one indicia defines one contiguous line having a width less than approximately 2.0 mm and opening through said reflective layer; and
   at least two light sources configured to project light rays through said contiguous line.

9. An apparatus as in claim 8 wherein said at least one indicia has a symbolic meaning abstractly associated with a shape.

10. An apparatus as in claim 8 configured such that when mounted on a left side of a controlled vehicle at least one indicia indicates that the controlled vehicle is about to move or is moving to the left when an associated light source is energized.

11. An apparatus as in claim 8 configured such that when mounted on a right side of a controlled vehicle at least one indicia indicates that the controlled vehicle is about to move or is moving to the right when an associated light source is energized.

12. An apparatus as in claim 8 comprising a supplemental turning indicator and a side object detection indicator wherein both indicators are defined by said one contiguous line.

13. An apparatus as in claim 12 wherein said supplemental turning indicator is defined by a chevron shaped opening.

14. An apparatus as in claim 12 wherein said side object detection indicator is defined by a triangular shaped opening.

15. An apparatus as in claim 12 wherein said side object detection indicator is defined by a chevron shaped opening.

16. An apparatus as in claim 8 wherein said one contiguous line is between approximately 0.8 mm and 2.0 mm wide.

17. An apparatus as in claim 8 wherein an average luminous flux density of said at least one indicia is between approximately 14.0 mlm/mm$^2$ and approximately 147.0 mlm/mm$^2$.

18. An apparatus, comprising:
    an electro-optic mirror element comprising at least one substrate comprising a reflective layer on at least a portion of a surface thereof;
    at least one indicia formed in said reflective layer, said at least one indicia defined by one contiguous line having a width of less than approximately 2.0 mm and opening through said reflective layer; and
    at least one light source configured to project light rays through said contiguous line.

19. An apparatus as in claim 18 wherein said at least one indicia has a symbolic meaning abstractly associated with a shape.

20. An apparatus as in claim 18 configured such that when mounted on a left side of a controlled vehicle at least one indicia indicates that the controlled vehicle is about to move or is moving to the left when an associated light source is energized.

21. An apparatus as in claim 18 configured such that when mounted on a right side of a controlled vehicle at least one indicia indicates that the controlled vehicle is about to move or is moving to the right when an associated light source is energized.

22. An apparatus as in claim 18 comprising a supplemental turning indicator and a side object detection indicator wherein both indicators are defined by said one contiguous line.

23. An apparatus as in claim 18 wherein said one contiguous line defines a chevron shaped opening that functions as a supplemental turning indicator.

24. An apparatus as in claim 18 wherein said one contiguous line defines a triangular shaped opening that functions as a side object detection indicator.

25. An apparatus as in claim 18 wherein said one contiguous line defines a chevron shaped opening that functions as a side object detection indicator.

26. An apparatus as in claim 18 wherein said contiguous line is between approximately 0.8 mm and 2.0 mm wide.

27. An apparatus as in claim 18 wherein an average luminous flux density of said at least one indicia is between approximately 14.0 mlm/mm$^2$ and approximately 147.0 mlm/mm$^2$.

28. An apparatus, comprising:
    a mirror element comprising at least one substrate comprising a reflective layer on at least a portion of a surface thereof;
    at least one contiguous line opening through said reflective layer, said line having a width of less than approximately 2.0 mm; and
    at least one light source configured to project light rays through said contiguous line substantially in a preferred direction, wherein a luminous intensity is greater than or equal to approximately 5.0 candelas.

29. An apparatus as in claim 28 wherein said mirror element is an electro-optic mirror element.

30. An apparatus as in claim 28 wherein said at least one light source comprises at least one LED.

31. An apparatus as in claim 28 wherein said at least one contiguous line defines an indicia.

32. An apparatus as in claim 31 wherein said at least one indicia has a symbolic meaning abstractly associated with a shape.

33. An apparatus as in claim 31 configured such that when mounted on a left side of a controlled vehicle at least one indicia indicates that the controlled vehicle is about to move or is moving to the left when an associated light source is energized.

34. An apparatus as in claim 31 configured such that when mounted on a right side of a controlled vehicle at least one indicia indicates that the controlled vehicle is about to move or is moving to the right when an associated light source is energized.

* * * * *

UNITED STATES PATENT AND TRADEMARK OFFICE
CERTIFICATE OF CORRECTION

PATENT NO. : 7,452,113 B2 Page 1 of 1
APPLICATION NO. : 11/128478
DATED : November 18, 2008
INVENTOR(S) : Mark W. Newton et al.

It is certified that error appears in the above-identified patent and that said Letters Patent is hereby corrected as shown below:

*Column 3, lines 41 and 42, "predetermine" should be -- predetermined --.
*Column 4, line 13, "136b2" should be -- 234b4 --.
*Column 6, line 3, "271, g1271h1" should be -- 271g1, 271h1 --.
*Column 6, line 64, "device" should be -- devices --.
*Column 9, line 35, "2e02h" should be -- 2e - 2h --.
*Column 9, line 53, "6356,376," should be -- 6,356,376, --.
*Column 11, line 52, "define" should be -- defines --.
*Column 13, line 28, "151Oa" should be -- 1510a --.
*Column 17, lines 14 and 15, "provided" should be -- providing --.
*Column 17, line 40, "mount" should be -- mounted --.
*Column 17, line 52, "once" should be -- ounce --.
*Column 17, lines 53 and 54, "once" should be -- ounces --.
*Column 18, line 24, "140.1" should be -- 140.19 --.

Signed and Sealed this

Seventeenth Day of February, 2009

JOHN DOLL
*Acting Director of the United States Patent and Trademark Office*